(12) United States Patent
Bleau et al.

(10) Patent No.: US 7,907,179 B2
(45) Date of Patent: Mar. 15, 2011

(54) COMMAND MODULE FOR CONTROLLING THE CAMERA

(75) Inventors: Charles A. Bleau, Atlanta, GA (US); Raymond C. DuVarney, Liburn, GA (US)

(73) Assignee: Scimeasure Analytical Systems, Inc., Decatur, GA (US)

(*) Notice: Subject to any disclaimer, the term of this patent is extended or adjusted under 35 U.S.C. 154(b) by 44 days.

(21) Appl. No.: 12/244,957

(22) Filed: Oct. 3, 2008

(65) Prior Publication Data

US 2009/0046162 A1    Feb. 19, 2009

Related U.S. Application Data

(62) Division of application No. 10/457,052, filed on Jun. 6, 2003, now Pat. No. 7,466,344.

(60) Provisional application No. 60/387,316, filed on Jun. 7, 2002.

(51) Int. Cl.
*H04N 5/232* (2006.01)

(52) U.S. Cl. .................................. 348/211.11

(58) Field of Classification Search ............. 348/211.11, 348/211.99
See application file for complete search history.

(56) References Cited

U.S. PATENT DOCUMENTS

| | | |
|---|---|---|
| 4,460,836 A | 7/1984 | Tsunekawa et al. |
| 4,594,613 A | 6/1986 | Shinbori et al. |
| 5,221,964 A | 6/1993 | Chamberlain et al. |
| 5,329,312 A | 7/1994 | Boisvert et al. |
| 5,386,230 A | 1/1995 | Jeng |
| 5,479,206 A | 12/1995 | Ueno et al. |
| 5,493,332 A | 2/1996 | Dalton et al. |
| 5,563,655 A | 10/1996 | Lathrop |
| 5,585,856 A | 12/1996 | Nakaya et al. |
| 5,696,553 A | 12/1997 | D'Alfonso et al. |
| 5,714,909 A | 2/1998 | Jackson |

(Continued)

FOREIGN PATENT DOCUMENTS

EP    0574105 A1    12/1993

(Continued)

OTHER PUBLICATIONS

Fred Harris, "4th ESO CCD Workshop Optical Detectors for Astronomy", Workshop notes, Sep. 14, 1999, pp. 1-19.

(Continued)

*Primary Examiner* — James M Hannett
(74) *Attorney, Agent, or Firm* — Dean W. Russell; Jason D. Gardner; Kilpatrick Townsend & Stockton LLP

(57) ABSTRACT

Disclosed herein is a camera system and camera controller having a modularized design. Camera control functions within the controller are distributed among a number of modules, each module performing a component task of controlling a camera. Individual modules can perform tasks such as generating clock signals, digitizing an analog video signal, and providing multiplexed digital video output. Modules communicate with each other over a common bus sufficient to carry the signals necessary to control the camera. The system implements a RAM-based digital sequencer that provides the capability of loading bit patterns into memory and using these patterns to generate waveforms for clocking a CCD. Clock and readout sequences can be composed in a high level language, compiled and uploaded into the controller. Adjustable clamp and sample signal delays used in digitizing an analog video signal provide the capability to optimize the performance of the system in a given application.

25 Claims, 18 Drawing Sheets

U.S. PATENT DOCUMENTS

| | | | |
|---|---|---|---|
| 5,731,834 A | 3/1998 | Huot et al. | |
| 5,740,303 A | 4/1998 | Ban | |
| 5,784,099 A | 7/1998 | Lippincott | 348/222.1 |
| 5,790,188 A | 8/1998 | Sun | |
| 5,821,994 A | 10/1998 | Tani | |
| 5,892,473 A | 4/1999 | Shin | |
| 6,025,875 A | 2/2000 | Vu et al. | |
| 6,135,353 A | 10/2000 | Konosu et al. | 235/462.09 |
| 6,137,101 A | 10/2000 | Yokogawa et al. | |
| 6,201,570 B1 | 3/2001 | Murata et al. | |
| 6,222,175 B1 | 4/2001 | Krymski | |
| 6,288,742 B1 | 9/2001 | Ansari et al. | |
| 6,493,025 B1 | 12/2002 | Kiriyama et al. | 348/207.1 |
| 6,498,621 B1 | 12/2002 | Ikeda et al. | 348/222.1 |
| 6,573,931 B1 | 6/2003 | Horii et al. | |
| 6,747,695 B1 | 6/2004 | Afghahi | |
| 6,844,896 B2 | 1/2005 | Henderson et al. | |
| 6,975,351 B2 | 12/2005 | Ikeda et al. | |
| 7,289,145 B2 | 10/2007 | Johnson et al. | |
| 7,466,344 B2 | 12/2008 | Bleau et al. | |
| 7,719,577 B2 | 5/2010 | Bleau et al. | |
| 7,817,188 B2 | 10/2010 | Bleau et al. | |
| 2001/0019361 A1 | 9/2001 | Savoye | |
| 2002/0051067 A1 | 5/2002 | Henderson et al. | |
| 2002/0171741 A1 | 11/2002 | Tonkin et al. | |
| 2002/0176009 A1 | 11/2002 | Johnson et al. | |
| 2003/0011691 A1 | 1/2003 | Nagao | |
| 2004/0171938 A1 | 9/2004 | Grable | |
| 2004/0183769 A1 | 9/2004 | Scheyer et al. | |
| 2004/0239773 A1 | 12/2004 | Bleau et al. | |
| 2005/0185002 A1 | 8/2005 | Kitsugi et al. | 345/629 |
| 2005/0285973 A1 | 12/2005 | Singh et al. | |
| 2006/0117274 A1* | 6/2006 | Tseng et al. | 716/1 |
| 2009/0027556 A1 | 1/2009 | Bleau et al. | |
| 2009/0033771 A1 | 2/2009 | Bleau et al. | |
| 2009/0033778 A1 | 2/2009 | Bleau et al. | |
| 2009/0046167 A1 | 2/2009 | Bleau et al. | |
| 2009/0046168 A1 | 2/2009 | Bleau et al. | |

FOREIGN PATENT DOCUMENTS

| | | |
|---|---|---|
| EP | 0776126 A1 | 5/1997 |
| EP | 0776126 B1 | 8/2001 |
| JP | 2002-185828 | 6/2002 |
| JP | 2002-232790 | 8/2002 |

OTHER PUBLICATIONS

Scimeasure, "SciMeasure Wavefront Sensor Cameras and their Application in the 5m Palomar Adaptive Optics System", cfao.ucolick.org/past_meetings/wavefront, Nov. 9, 1999, pp. 1-19.

Cindy Skrzycki, "The Regulators—System's Trademark: Have a Slow Day", Washington Post.com, November 19, 1999, pp. 1-3.

Duvarney, et al., "EEV CCD39 Wavefront Sensor Cameras For AO and Interferometry, Adaptive Optical Systems Technology," Proceedings of SPIE vol. 4007, Mar. 29-31, 2000, pp. 1-16.

Ray Duvarney, "Multiple Guide Star Wavefront Sensing for Palomar AO", Beyond Conventional Adaptive Optics, 2001, pp. 1-10.

Lil'Joe, "Lil' Joe—A new, small and versatile CCD Controller and platform independent system for high speed, low noise image readout", PowerPoint presentation, Jun. 7, 2002, pp. 1-15.

* cited by examiner

```
pattern read_pixel;

#FB    11111  100  000  000  0    Cmd
#210   54321  098  765  432  1    SCt  210
#             III  SSS  RRR  G
#             123  123  123

111    11111  010  010  010  1    000  011;   # Latch data
111    11111  010  010  010  0    000  101;   # Read
111    11111  010  010  010  0    001  101;   # Read
111    11111  010  010  010  0    001  101;   # Read
111    11111  010  010  010  0    011  101;   # Read
111    11111  010  010  001  0    111  110;   # Data Ready
111    11111  010  010  001  0    111  111;
111    11111  010  010  001  0    111  111;
111    11111  010  010  001  0    111  111;
111    11111  010  010  001  0    110  111;
111    11111  010  010  100  0    110  111;
111    11111  010  010  100  0    110  111;
111    11111  010  010  100  0    110  111;
111    11111  010  010  100  0    110  111;
111    11111  010  010  100  0    100  111;
111    11111  010  010  100  0    000  111;
111    11111  010  010  100  0    000  111;
111    11111  010  010  100  0    000  111;
111    11111  010  010  100  0    000  111;
111    11111  010  010  100  0    000  111;

end define;
```

Figure 4E

I1
I2
I3
S1
S2
S3
R1
R2
R3
G
Sample
Clamp
Turbo
Code

Figure 4F

COMMAND MODULE FOR CONTROLLING THE CAMERA

CROSS-REFERENCE TO RELATED APPLICATIONS

This patent application is a U.S. divisional, which claims priority to nonprovisional application Ser. No. 10/457,052 filed on Jun. 6, 2003, filed pursuant to Title 35, United States Code §§100 et seq. and 37 C.F.R. Section 1.53(b), and claiming priority under Title 35, United States Code §119(e) to U.S. provisional application No. 60/387,316 filed Jun. 7, 2002 naming Charles A. Bleau and Raymond C. DuVarney as inventors.

BACKGROUND OF THE INVENTION

1. Field of the Invention

This invention relates generally to charge coupled devices (CCDs), MOS, and other pixel sensor arrays, cameras, controllers, imaging systems, and methods of controlling and operating the same. The invention is directed to a controller and camera system having a modularized architecture making it extensible to all known types of CCDs and other pixel sensor arrays. The present invention is particularly well suited for use in scientific imaging applications such as adaptive optics, wavefront sensing, interferometry, fringe tracking, and neuroscience research. The small form factor with remote head of the present invention also makes the system ideally suited to microscopy applications, applications with limited space near the optical path, and applications sensitive to thermal disturbance.

2. Description of the Related Art

CCDs (Charge Coupled Devices) are semiconductor imaging devices that are essentially an array of photo-sensitive capacitors controlled by a grid of wires. Bias voltages are used to power the device and clock voltages are used to move the charge through the device. Frame transfer CCDs have an image array and one or more serial registers. The image accumulates as photo-electrons are generated by light incident on the device. A shutter is generally employed to prevent streaking while the image is transferred to the serial register(s) through which the pixels are shifted out to an output driver one pixel at a time. Frame storage CCDs also have an image (frame) store, lessening the requirement for a shutter. Interline CCDs are similar, but have a storage pixel for each image pixel within the image array. The storage pixels, however, take up space within the image and they therefore result in the disadvantage of the image pixels not being contiguous.

A CCD camera is generally comprised of a CCD and a CCD controller. They are frequently housed in the same enclosure, especially in consumer applications, but are also commonly housed separately in high performance and specialty applications. The CCD controller provides the bias voltages, the clock voltages, output driver(s), and must clock the CCD in a manner that achieves image integration and readout. In the case of digital cameras, the analog voltage(s) from the output(s) must also be digitized.

There are many parameters that must be considered when evaluating the performance of a CCD or a CCD camera. These include CCD well depth (the number of electrons that can be stored in each pixel); the readnoise (a fundamental property of the CCD output amplifier which is frequency dependent); the dark current noise (a fundamental property of the bulk silicon, which is temperature dependent); the pixel rate (the frequency at which the pixels are output); the frame rate and the frame size.

There are many CCD camera designs extant in the consumer and scientific domains. Consumer CCD camera design choices are generally influenced by consumer-driven ideals of attractive appearance and acceptable performance, and scientific CCD cameras are generally designed with a specific application in mind and support a limited number of CCDs in a single form factor. Consumer grade CCDs and CCD cameras typically strive to deliver the highest resolution image at an acceptable visual quality. Scientific CCD cameras are typically designed to minimize readnoise at a desired readout rate while maximizing dynamic range.

Many of the technologies used in prior art cameras are becoming obsolete. One of the major disadvantages of the prior art is the difficulty in achieving the very highest performance in terms of small form factor, high frame rate and low readnoise with a variety of different CCDs due to the diversity of CCD input and output requirements.

SUMMARY OF THE INVENTION

The invention, in its various embodiments, overcomes the disadvantages noted hereinabove with respect to previous technologies, and achieves advantages heretofore not possible.

The camera controller of the present invention comprises a bus connected to a number of modules. The modules can communicate over the shared bus in controlling a camera head. The controller comprises a command module that can generate a waveform and transmit the waveform on the bus and can include an input module that can receive an analog video signal from an image pixel array, convert the signal into digital video data, and transmit the digital video data on the bus.

The camera controller can comprise a clock driver module that modifies the voltage levels of a clock signal to create a driver level output to be used to clock an image pixel array. Power can be supplied to the bus by an external power supply, and a service module can be included that provides power and bias voltages to a camera head. Additionally, the camera controller can comprise an output module for controlling the output of digital video data to an external device.

The camera controller of the present invention can be configured to control multiple image pixel arrays at the same time. Multiple image arrays can be used to perform three dimensional or stereo imaging.

A command module of the present invention comprises random access memory, a microcontroller and a programmable logic device configured to operate as a digital sequencer. The command module can transmit waveforms on the bus along with bits that contain control information. Among other uses, the control bits can indicate the start of a new frame of video data, and the start of a new line of video data. Using I$^2$C serial protocol, the command module can communicate with other modules on the bus to, for example, set an offset voltage in an input module, the gain of an amplifier in an input module, or choose a filter setting in an input module.

Digital sequences can be uploaded to the command module and stored in RAM. The RAM can be subdivided into Control RAM containing programs, and Sequence RAM containing sequence data. Additionally, the command module can comprise flash RAM for storing control parameters and sequence data. A command module can include an integration accumulation register that controls the time that the image pixel array is exposed to a light source before the accumulated data is read out.

The command module can include an external interface to allow an external device to select a program to be run by the command module. The external interface can also allow the camera controller to be synchronized with other devices. Additional output signals such as start-of-integration and start-of-sequence signals can be provided on the external interface to allow for more robust external synchronization and control.

Input modules of the present invention can use correlated double sampling in digitizing an analog video signal from a camera head. The input modules can additionally include clamp and sample delay circuits to allow for optimization of camera performance. These circuits can allow for the delay of clamp and sample signals in one quarter nanosecond increments. Furthermore, a high speed shunt can be included that allows the low pass filters of the input module to be bypassed in order to speed the relaxation of a CCD output from a reset pulse. The high speed shunt can comprise an operational amplifier having a high speed enable.

The clock driver modules of the present invention comprise adjustable voltage regulators which can be adjusted to match the clock outputs of the camera controller to the input requirements of a CCD. A first voltage level can be set and then a voltage span can be set. By setting the clock driver voltage levels in this manner, the likelihood of accidentally damaging a CCD can be reduced.

A camera head of the present invention comprises a preamplifier and an image pixel array. The preamplifier can be used to provide a standard photon responsivity from the image pixel array as well as conditioning input clocks and bias voltages.

BRIEF DESCRIPTION OF THE DRAWINGS

FIG. 4E shows twenty (20) exemplary digital patterns according to an embodiment of the present invention. In the example patterns shown, each pattern comprises twenty-four bits.

FIGS. 4F and 4G show 13 exemplary digital sequencer output waveforms with a corresponding exemplary control code according to one embodiment of the present invention. In the waveforms shown, the image array waveforms (I1, I2, I3) and the storage array waveforms (S1, S2, S3) are constant.

DESCRIPTION OF THE PREFERRED EMBODIMENTS

The description of the preferred embodiments of the present invention will hereinafter refer to the drawings, in which like numerals indicate like elements throughout the several figures.

Figure 1:
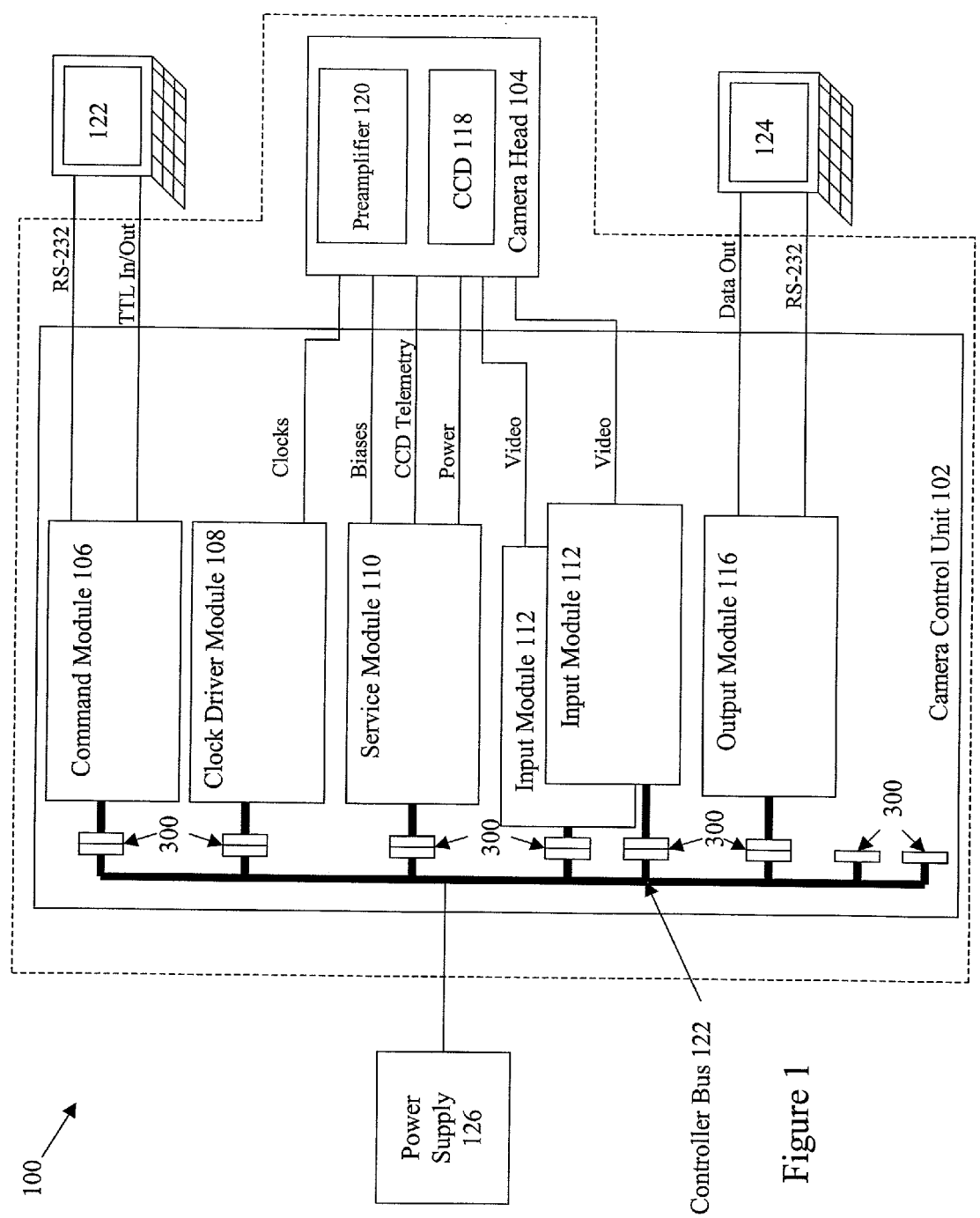
FIG. 1 is a block diagram of one embodiment of the invention including the Camera Control Unit and Camera Head.

In FIG. 1, a general block diagram of a system 100 in accordance with the invention is shown. Camera System 100 comprises Camera Control Unit (CCU) 102 and at least one Camera Head 104. CCU 102 comprises Controller Bus 122, Command Module 106, one or more Clock Driver Modules 108, one or more Service Modules 110, one or more Input Modules 112, and one or more Output Modules 116. The modules can be interfaced to the Controller Bus 122 through Connectors 300. Camera Head 104 comprises Preamplifier 120 and CCD 118. Command Module 106 includes a RS-232 interface for communication with external devices as well as transistor-transistor logic (TTL) level inputs and outputs that support external hold for control of the CCU by external devices and synchronization with external devices.

Command Module 106 directs the operation of CCU 102. Command Module 106 can communicate with an external device or devices via an RS-232 serial port and can also communicate via TTL level outputs further described herein. For purposes of illustration, the RS-232 and TTL level interfaces are shown connected to external computer 122, but communication with the Camera System 100 can be accomplished through any device supporting TTL level connections and/or those compliant with the RS-232 serial interface standard. Further, it is not necessary that the two interfaces are connected to the same device or to any device. Camera System 100 can be controlled externally or function as a standalone system.

Clock Driver Module(s) 108 converts the TTL level clocking sequence information it receives over Controller Bus 122 to driver level outputs that are in turn provided to Camera Head 104. Service Module 110 inputs basic power sources from external Power Supply 126 and provides derived power to modules in CCU 102 on Controller Bus 122. It also provides adjustable bias voltages and other power to Camera Head 104 necessary for various functions of Camera Head 104 such as power for a thermoelectric cooling device (TEC). Service Module 110 can also include one or more dedicated circuits for receiving telemetry such as temperature and pressure data from Camera Head 104 as well as circuitry for CCD heater control in embodiments using liquid nitrogen cooling. Input Module(s) 112 receive video data from Camera Head 104 and make this data available in a digital format on Controller Bus 122. Output Module(s) 116 manage the output of video data from the camera system utilizing a demultiplexed data output format or a standard AIA interface or other digital protocol output format. As dictated by the AIA standard and others, Output Modules(s) 116 can include an RS-232 interface. For purposes of illustration, the RS-232 interface and the output data lines are shown connected to external computer 124, but communication with Camera System 100 can be accomplished through any device supporting these interfaces. Further, it is not necessary that the RS-232 interface be connected to the same device as the output data lines or to any device. In addition, computer 122 and computer 124 could potentially be (and commonly are) the same device.

Controller Bus

Figure 2:
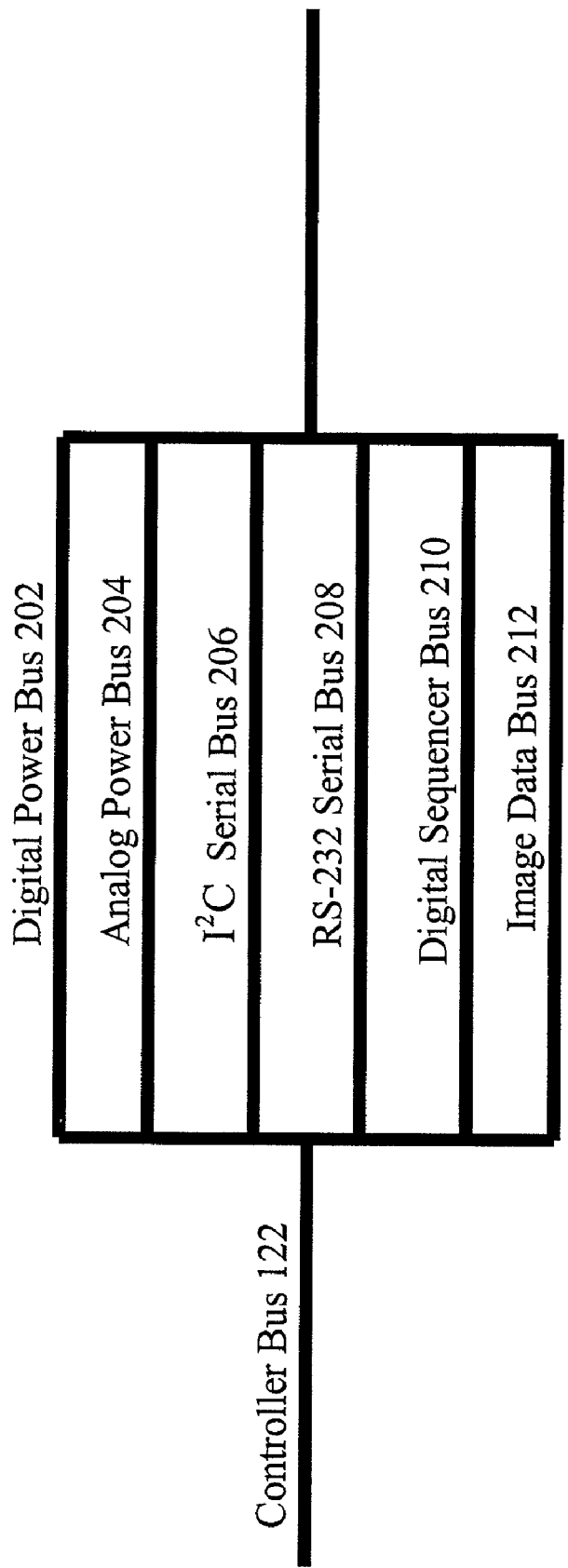
FIG. 2 shows the controller bus and the component buses which it comprises.

Controller Bus 122 can be implemented using a backplane configuration that interfaces with each module of CCU 102. The Controller Bus can be a means for communicatively connecting a plurality of modules for controlling a camera head. In FIG. 2, Controller Bus 122 is shown in further detail. Controller Bus 122 incorporates all the features required to control a wide range of scientific CCDs, MOS-based, and other pixel sensor arrays. Controller Bus 122 comprises at least 6 sub-buses: Digital Power Bus 202, Analog Power Bus 204, I²C Serial Bus 206, RS-232 Serial Bus 208, Digital Sequencer Bus 210, and Image Data Bus 212.

Digital Power Bus 202 provides +5V and Digital Ground to all the connections on the Controller Bus 122, providing power to the digital circuits within the camera. Digital circuits are notoriously noisy and it is important to isolate them from the analog circuits to minimize readnoise.

Analog Power Bus 204 provides +12V, −12V, +5V, −5V, +24V and Analog Ground to all the connections on the Controller Bus 122 to provide power to the analog circuits within CCU 102. Other analog voltages that may be required can be derived from these voltages. It is generally more practical to use a +12V, −12V, +5V triple output external Power Supply 126 and derive −5V and +24V on Service Module 110. However, Service Module 110 can be configured to allow the −5V and +24V supplies to be external also.

I²C Serial Bus 206 is a two-wire bus well known in the art and is used to communicate with any and all modules that have multiple settings or readable devices. Examples include selecting gains on an Input Module, or modes on an Output Module, as well as setting the heater control and reading temperatures and vacuum on a Service Module. Communication occurs at a relatively low speed and relatively infrequently. Because the I²C Bus operates at a relatively low speed compared to system clock frequencies it can operate asynchronously with the camera without generating electrical noise.

RS-232 Serial Bus 208 is for the purposes of external control. This is an important feature for the purpose of making the controller computer-controllable, but platform-independent. Command Module 106 hosts an RS-232 serial bus controller. However, since RS-232 Serial Bus 208 is part of Controller Bus 122, RS-232 Serial Bus 208 is available on the system backplane, and connection can be made to any module that uses it.

Digital Sequencer Bus 210 is used to control high speed events in the camera. These are typically clocks, including the system clock, that control the CCD clock inputs, dedicated signals such as Clamp, Sample and Turbo, and special control bits. The clocks are used to shift charge through cells, registers, and the like in the CCD. Clamp, Sample and Turbo signals are used in digitizing the video output from the CCD. Clamp and Sample signals are used to implement Correlated Double Sampling, and the Turbo signal is used to control a filter bypass shunt. The function of each of these signals will be discussed later in detail. The special control bits are used to control the flow of, and indicate the meaning of the image data generated within the camera.

Image Data Bus 212 is used to propagate the image data as it is generated. The control bits indicate the meaning of the image data and will be described later.

Controller Bus 122 can take a variety of physical forms. In a preferred embodiment, circuit boards which conform to a standard 3 U 160 mm (half height) form factor are used. The slot spacing for such boards is 0.8 inches (or 4 HP). Circuit boards and industry standard enclosures are available in 7, 10, 15, and 21 slot configurations. In a preferred embodiment a 7-slot board is used to form the backplane of CCU 102 to implement Controller Bus 122.

Figure 3:
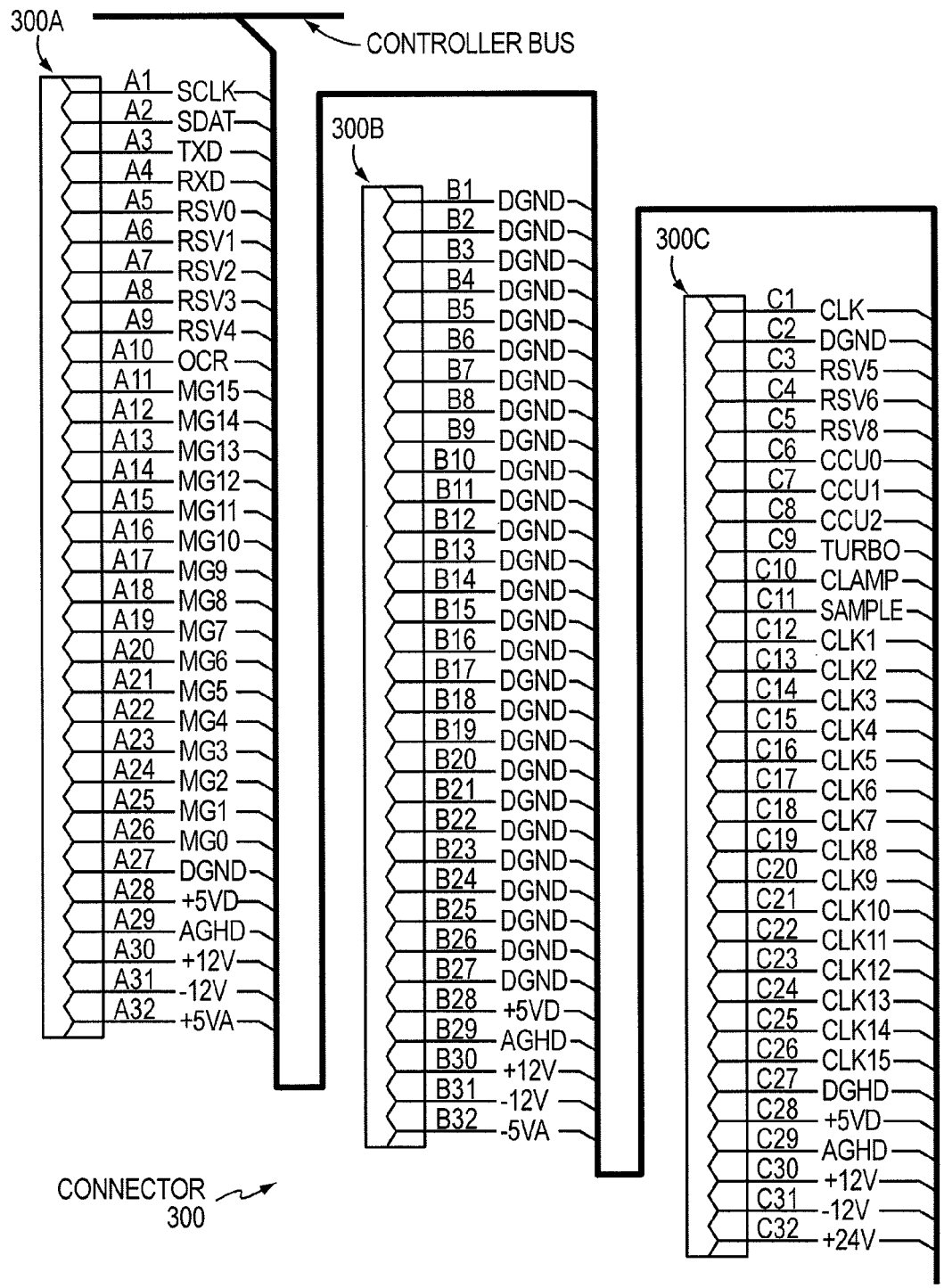
FIG. 3 shows an embodiment of the Controller Bus.

In FIG. 3, a ninety-six conductor implementation of Controller Bus 122 is shown. The backplane Connector 300 has ninety-six conductors. The conductors can be separated into thirty-two conductor groups designated 300A, 300B, and 300C.

The conductors labeled SCLK (A1) and SDAT (A2) form I²C Serial Bus 206. The conductors labeled TXD (A3) and RXD (A4) form RS-232 Serial Bus 208. Conductors labeled RSV0-RSV7 (A5-A9), and (C3-C5) are reserved in this embodiment and are not used. Conductors OOR (A10), and IMG0-IMG15 (A11-A26) form Image Data Bus 212. Conductors labeled DGND (A27, B1-B27, C2, C27) and +5VD (A28, B28, C28) form Digital Power Bus 202. Conductors labeled AGND (A29, B29, C29), +12V (A30, B30, C30), −12V (A31, B31, C31), +5VA (A32), −5VA (B32), and +24V (C32) form Analog Power Bus 204. Conductors labeled CLK (C1), CCU0-CCU2 (C6-C8), TURBO (C9), CLAMP (C10), SAMPLE (C11), and CLK1-CLK15 (C12-C26) form Digital Sequencer Bus 210.

The Controller Bus architecture enables different camera designs for corresponding image sensor arrays. The modularized design of the Camera Control Unit 102 is now described.

Command Module

Figure 4A:
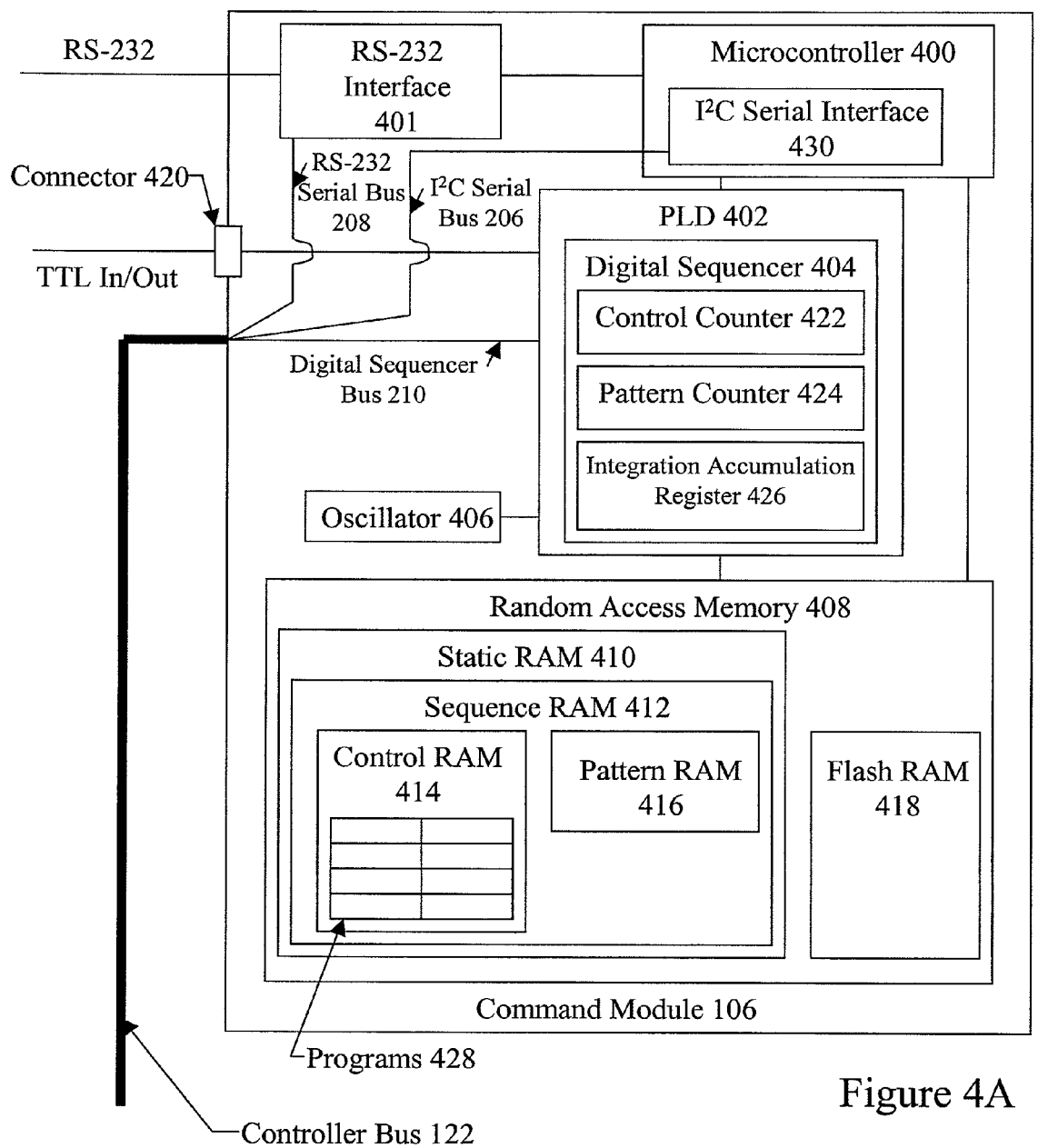
FIG. 4A is a block diagram of a Command Module of the present invention.

FIG. 4A is a block diagram of a Command Module 106 according to the present invention. Command Module 106 comprises Microcontroller 400, an RS-232 Serial Interface 401, PLD 402, Oscillator 406, Random Access Memory (RAM) 408. Digital Sequencer 404 is implemented in PLD 402. RAM 408 comprises Static RAM 410 and Flash RAM 418. Sequence RAM 412 is implemented in Static RAM 410 and comprises Control RAM 414 and Pattern RAM 416. Command Module 106 also includes an RS-232 interface and TTL level inputs and outputs for external control and monitoring functions. The TTL level inputs and outputs are provided at connector 420. Command Module 106 interfaces with Controller Bus 122.

By means of Microcontroller 400 and PLD 402, Command Module 106 implements RS-232 and I²C serial interfaces, interfaces with fast Static RAM (SRAM 410) and Flash RAM 418, and a high speed Digital Sequencer 404. Oscillator 406 provides a clock signal to Digital Sequencer 404. Oscillator 406 provides a clock signal to the PLD 402 to run the Digital Sequencer 404, the same clock signal being divided for use at the Microcontroller 400 clock. In a preferred embodiment the Oscillator 406 outputs a 50 Mhz clock signal to a 24-bit Digital Sequencer resulting in a resolution of 20 ns for each signal. PLD 402 is preferably a Xilinx™ 9500 series CPLD due to the availability of hard-wired versions for space flight and their suitability to the fast, wide buses and counters of a CCU according to the present invention. Other PLDs, however, may be used.

The RS-232 serial interface allows communication with external devices and enables external control by means of the AIA or any other Standard Protocol for digital cameras. The physical connection may be made through any module that supports it. In a preferred embodiment Command Module 106 supports the RS-232 physical connection via an externally accessible panel connector such as a DB9 connector.

The I²C serial interface is used by Command Module 106 to control and query other modules on Controller Bus 122. This is a simple two-wire bus, well known in the art, that allows for control of settings such as gain or offset and reading of temperature without using the Digital Sequence Bus or the Image Data Bus.

Digital Sequencer 404 resides in PLD 402 and uses data in fast Static RAM 410 to generate clock signals. Digital Sequencer 404 reads data in Static RAM 410 and generates a TTL level clock signal with a logical value of "0" or "1" corresponding to the data read from Static RAM 410. The Microcontroller 400 can upload digital patterns through the RS-232 Interface and store them in Flash RAM 418 or fast Static RAM 410. Arrangements of these digital patterns form digital sequences. Digital sequences are written to provide clock signals to an image pixel array and other signals synchronous with those clock signals that are designed to facilitate the reading of image data from the image pixel array. These sequences can be written in a simple hierarchical high-level language. The resulting code can then be compiled using a sequence compiler to generate the actual bit patterns to be loaded into Static RAM 410. The bits of the patterns are mapped to, and communicated on respective lines of the Digital Sequencer Bus 210 to other modules in the CCU 102. In one embodiment, each pattern is 24-bits wide with twenty-one bits of the sequence patterns mapped to Digital Sequencer Bus 210, on Controller Bus 122. The bits mapped to Digital Sequencer Bus 210 include image pixel array clock signals, signals such as Clamp, Sample and Turbo, and control bits. Additional bits within the sequence are used to control looping within the sequence itself. Hence PLD 402 can generate a digital sequence that repeats after completion of the output of the sequence to generate a variety of repetitive signals of varying complexity.

CCD cameras generally use state-machine-based sequencers that rely on sequential logic to generate the clock patterns, or DSP-based sequencers that use software to generate the clock patterns on the fly. The former has the disadvantage of being impossible to program arbitrarily, and the latter has difficulties with speed and complexity. The memory-based Digital Sequencer of the present invention has the advantages that the contents of the memory are programmable and can be changed with ease. There is a limitation in terms of overall unique sequence length due to the word length of the memory or register storing the sequence, but this is true of all sequencers.

Sequences can be uploaded to Command Module 106 through the RS-232 Serial Port. Alternatively, or in addition, one or more of the sequences can be stored in Flash RAM 418. This is also true of the various settings within the controller, such as gain or offset which will be described later. The Microcontroller 400 can copy Sequences stored in Flash RAM 418 and store them in Sequence RAM 412.

Sequence RAM 412 comprises Control RAM 414 and Pattern RAM 416. In one embodiment, Control RAM 414 is 8-bits wide and is segmented into eight programs 428, each of which has a list of 16,384 Pattern Block addresses. In one embodiment, Pattern RAM 416 is twenty-four bits wide and is segmented into one-hundred twenty-eight blocks, each of which has a list of 1,024 bit patterns. The programs can be used to control a CCD in different ways. Programs can be written to control the CCD to perform differently depending on the application such as operating the CCD in a binning mode, or slowing down the frame and pixel rates in limited light conditions.

Figure 4B:
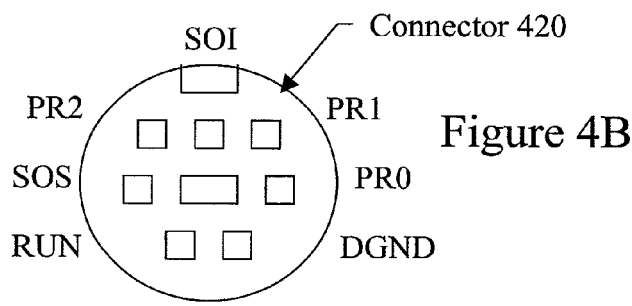
FIG. 4B shows an implementation of the special interface connector of the Command Module.

Program selection and synchronization of the controller to an external device, or vice versa, is often desirable in science. For this purpose, Command Module 106 provides this utility through an interface connector. Signals indicating Start of Sequence (SOS) and Start of Integration (SOI) are provided as TTL level outputs and a RUN signal is input as a TTL level signal. In addition, three program selector bits (PR0, PR1, PR2) are provided as TTL level inputs to allow program selection by an external device "on-the-fly". Program selection made "on-the-fly", as used herein, is defined as a program selection where the current program being executed by the controller can be changed in real-time. That is, the controller will complete executing the current program and being executing the newly selected program upon receiving the selection from an external device. FIG. 4B shows an embodiment of interface connector 420 implemented using a standard mini-DIN connector. Using this interface, the camera can respond to external events in selecting which CCD clocking mode to use in order to read the image at the correct time, or to discard image data that are unwanted. This interface can also be used, for example, to synchronize several cameras to one master camera by using one or more bits from the sequencer in the master camera system to control the other cameras.

Figure 4C:
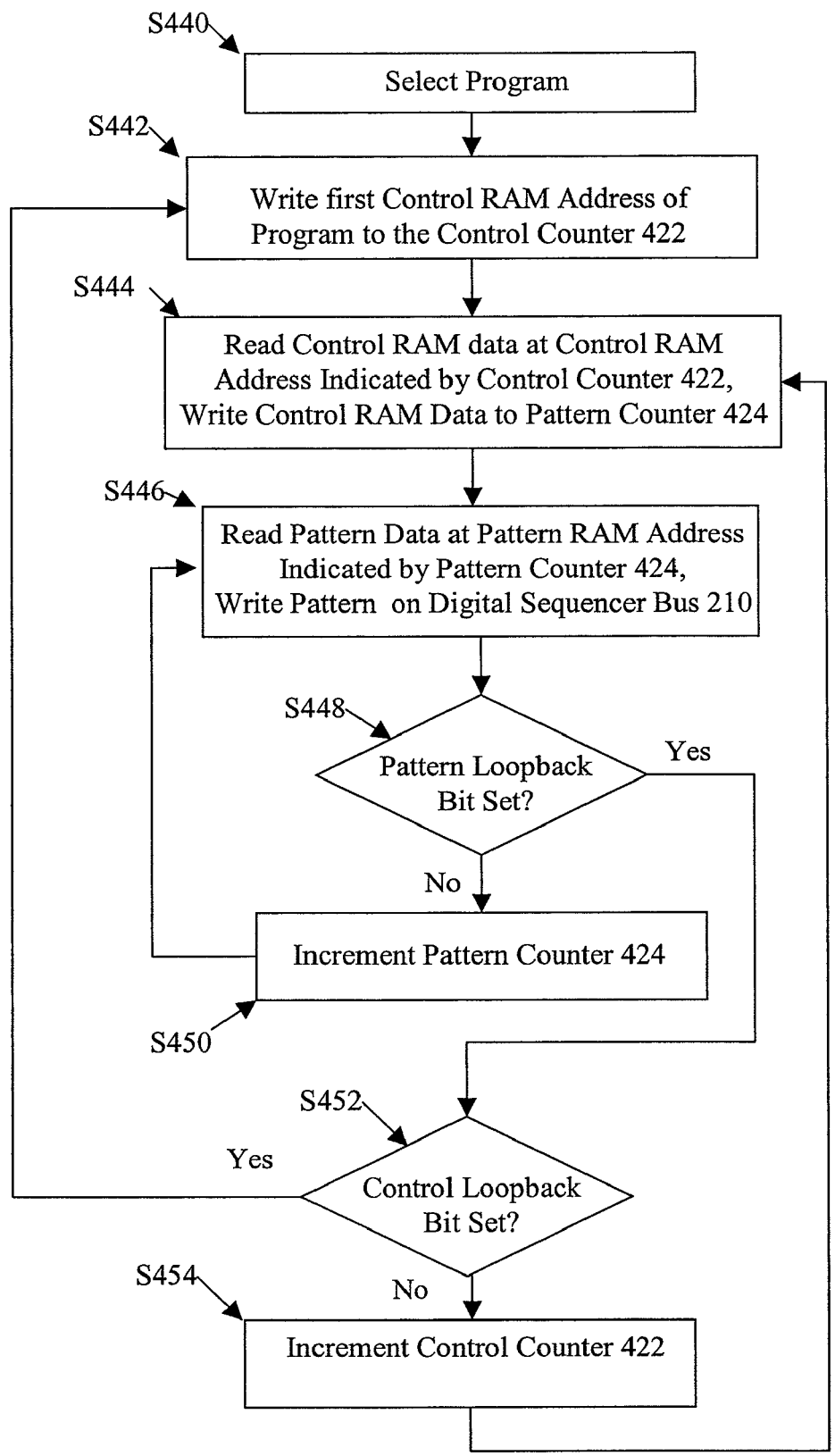
FIG. 4C is a flowchart showing the operation of an embodiment of a Command Module.

FIG. 4C is a flowchart depicting the operation of an embodiment of Command Module 106. At step S440 a program is selected from among the eight programs stored in Control RAM 414. Program selection can be made by Microcontroller 400 or by an external device using the PR0, PR1, and PR2 signals of Connector 420. At S442, PLD 402 writes the Control RAM address that corresponds to the beginning of the selected program to Control Counter 422. At S444, PLD 402 reads the Control RAM data at the Control RAM address indicated by Control Counter 422. Each 8-bit Control byte is comprised of a 7-bit Pattern Block address, allowing up to 128 Pattern Blocks, and a loopback bit. Hence, the data at this Control RAM address is a Pattern RAM address indicating the address of a pattern to be executed. PLD 402 writes this Pattern RAM address to Pattern Counter 424. At S446, PLD 402 reads the pattern data at the Pattern RAM address indicated by Pattern Counter 424. PLD 402 writes this data to Digital Sequencer Bus 210. At S448, PLD 402 checks to see if the pattern loopback bit in pattern data is set. If the pattern loopback bit is not set, PLD 402 increments Pattern Counter 424 at S450 and returns to S446. If the pattern loopback bit is set at S452, PLD 402 checks to see if the control loopback bit stored in Control Counter 422 is set. If the control loopback bit is not set, PLD 402 increments Control Counter 422 at S454 and returns to S444. If the control loopback bit is set, PLD 402 returns to S442.

There are two basic phases to reading an image out of a CCD. The first is image integration while the CCD is exposed to the image source, and the second is the readout. In frame storage or interline CCDs, these phases can overlap substantially and there may not even be a separate integration phase. However, during a separate integration phase, Digital Sequencer 404 can either stop clocking the CCD, or it can execute a special integration pattern. This is especially useful when a dithering technique can be used to minimize dark current within the CCD during long integration periods. The last pattern executed in each program is defined to be the integration pattern. The integration pattern can be written to cause the CCD to perform functions such as emptying the CCD frame store or exercising one or more CCD serial registers. An integration accumulation register can be set to repeat the integration pattern. In one embodiment, the integration accumulation register is 14 bits wide allowing the integration pattern to be repeated up to 16,384 times, giving extremely fine control over exposure times.

In operation, Integration Accumulation Register 426 is set to an initial value equal to the number of times that the integration pattern is to be executed. At the end of the execution of the integration pattern, Integration Accumulation Register 426 is decremented. If, after being decremented, Integration Accumulation Register 426 is not zero, the integration pattern is executed once more. The integration pattern is executed repeatedly, until Integration Accumulation Register 426 has been decremented to zero at which time the program ends. The total length of the integration pattern will be the initial value in Integration Accumulation Register 426 multiplied by the length of one integration pattern.

Figure 4D:
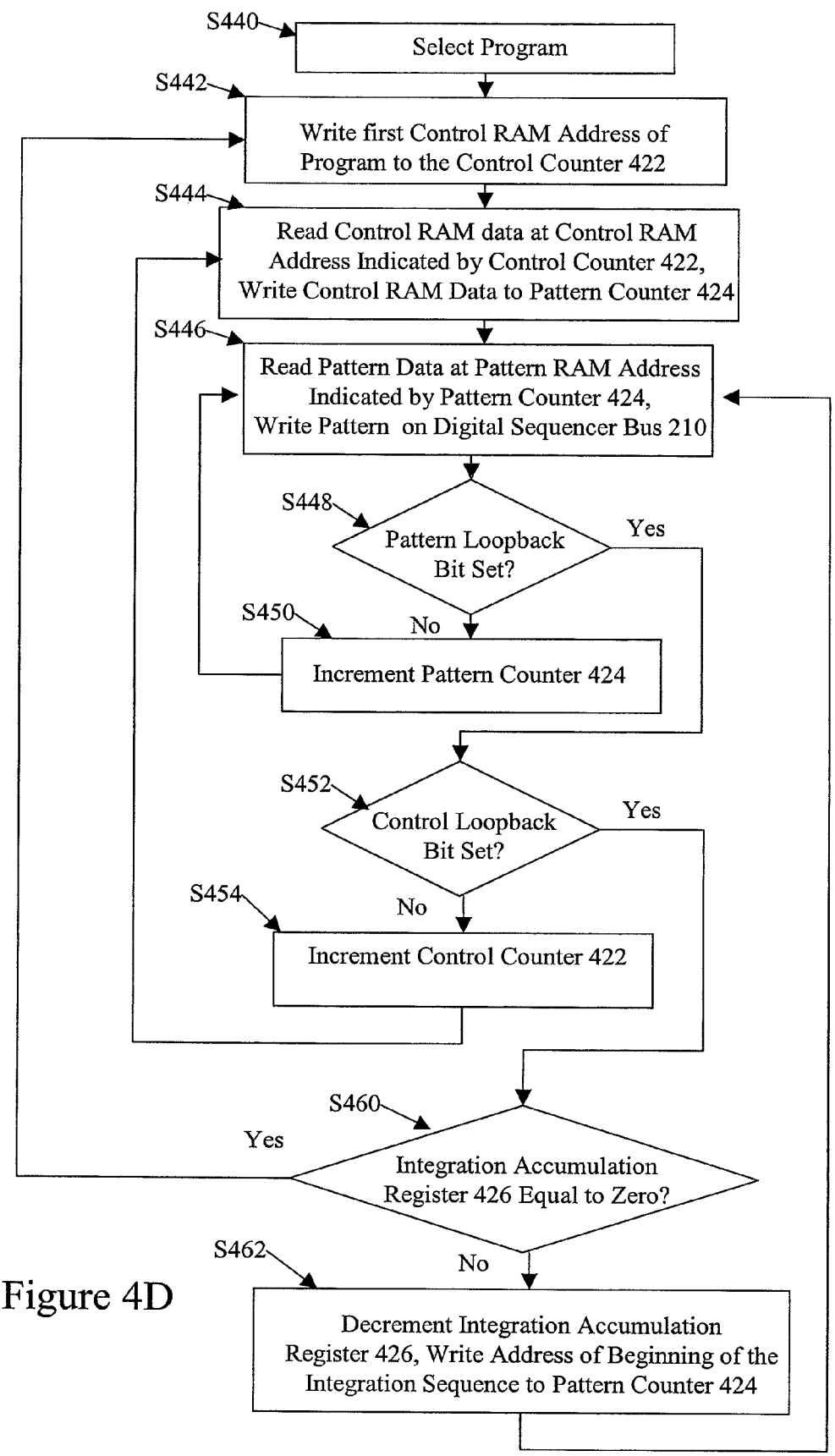
FIG. 4D is a flowchart showing the operation of an embodiment of a Command Module utilizing an Integration Accumulation Register.

FIG. 4D shows a flowchart depicting the operation of Command Module 106 in an embodiment using an Integration Accumulation Register 426. Operation proceeds as in FIG. 4C as described above until step S452. At S452, PLD 402 reads the control loopback bit currently stored in Control Counter 422. If the control loopback bit is not set, then operation continues as described in FIG. 4C. If the control loopback bit is set, however, PLD 402 then checks Integration Accumulation Register 426 to see if the register's value is zero at S460. If the value in the Integration Accumulation Register 426 is equal to zero, PLD 402 returns to S442. If the value in Integration Accumulation Register 426 is not equal to zero, PLD 402 decrements Integration Accumulation Register 426, and writes the address of the beginning of the integration sequence to Pattern Counter 424 in step S462. Following S462, PLD 402 returns to step S446.

Control Codes

Control Codes are formed by three bits within the sequence patterns and are used to control the flow of, and indicate the meaning of, the image data generated within the camera. Each pattern in the Pattern RAM 416 has these three control code bits. The control code bits are loaded into RAM as part of the sequence patterns. NULL is used to indicate the null condition and is generally ignored by all modules; SOF (Start of Frame) indicates that a new frame is about to begin and is used by external devices to determine when the data from a new frame is about to arrive; SOL (Start of Line) indicates that a new line is about to begin, resets the input channel counter and is used by external devices to determine when a new line of data is about to arrive; LATCH is used to latch the data from all the Analog to Digital (A/D) converters in the Input Modules; READ is used to put the current input channel data onto the Image Data Bus and increment the input channel counter; SKIP is used to increment the input channel counter and to indicate that the current input channel is being skipped; DATA READY is used to signal that all channels have been read and to reset the input channel counter; and RESERVED is reserved for future use to indicate a multi-word code, making the code set extensible.

In an embodiment, these codes NULL, SOF, SOL, LATCH, READ, SKIP, DATA READY, and RESERVED are represented by the bit patterns 000 through 111 respectively. It should be understood that all modules which are designed to manipulate data must have their own input channel counter that uses the codes to keep track of the current input channel so that it can identify the data that it is meant to receive. The operation of these codes is discussed further by module as relevant.

FIG. 4E shows twenty (20) exemplary digital patterns according to the present invention. In the example patterns shown, each pattern comprises twenty-four bits. Eight bits are unused and are set at a logic level high, these are the eight most significant bits shown in the figure. Three bits (I1, I2, I3) are mapped an image array of a CCD. Three bits (S1, S2, S3) are mapped to a storage array of a CCD. Three bits (R1, R2, R3) are mapped to a serial register of a CCD. One bit (G) is mapped to the reset gate of a CCD. The three bits labeled (S, C, t) correspond to Sample, Clamp, and turbo signals respectively and are not supplied to a CCD, but are part of the digital pattern conveyed on the Controller Bus 122. The remaining three bits (collectively labeled Cmd) contain control codes as described above. The control code bits are not supplied to a CCD, but are part of the digital pattern conveyed on the Controller Bus 122. The image array bits, storage array bits, serial register bits, and reset gate bit are used to generate signals for clocking a CCD image array.

Figure 4G:
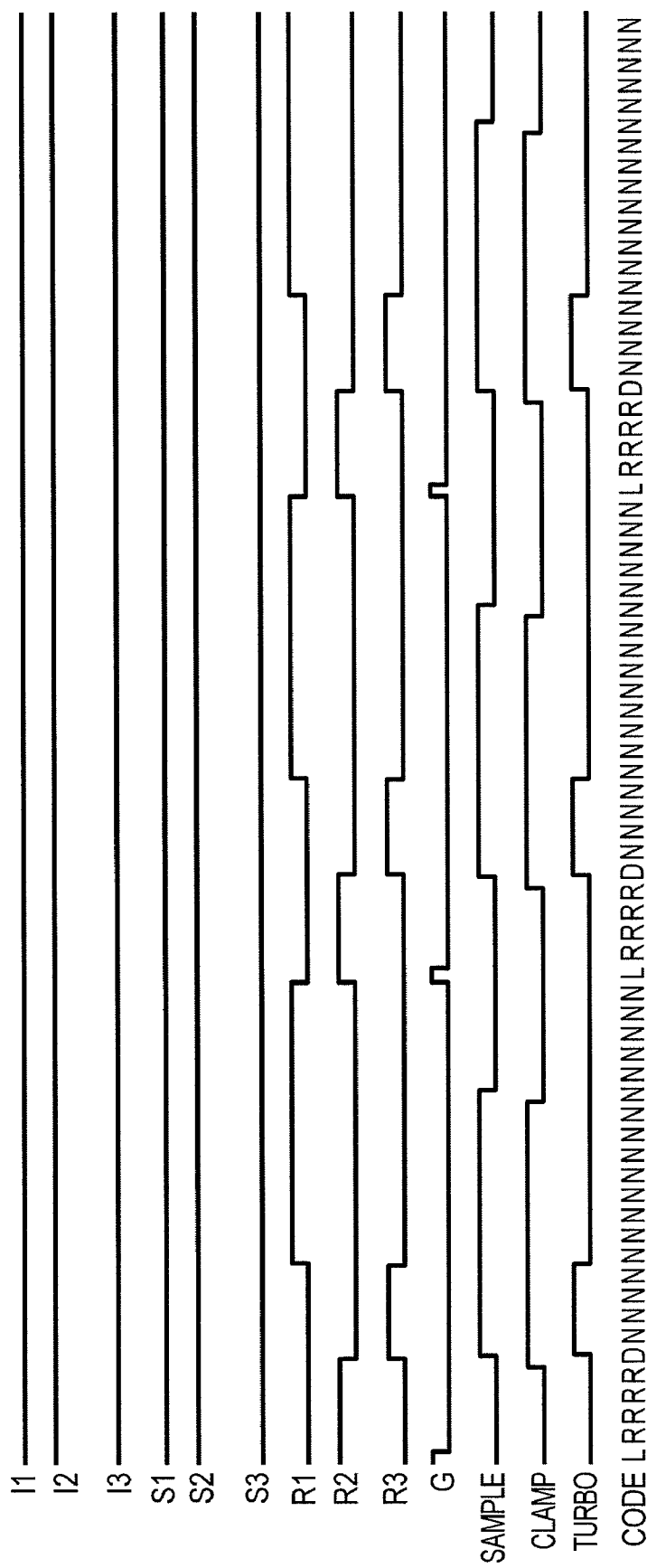

FIGS. 4F and 4G show 13 exemplary digital sequencer output waveforms according to the present invention along with a corresponding exemplary control code. In the waveforms shown, the image array waveforms (I1, I2, I3), and the storage array waveforms (S1, S2, S3) are constant. In the example shown, a CCD serial register is being read so the image and storage arrays are not being clocked. The serial register waveforms (R1, R2, R3) are changing as these signals are input to a CCD's serial register to move pixel charge off of the CCD to be read.

Figure 4H:
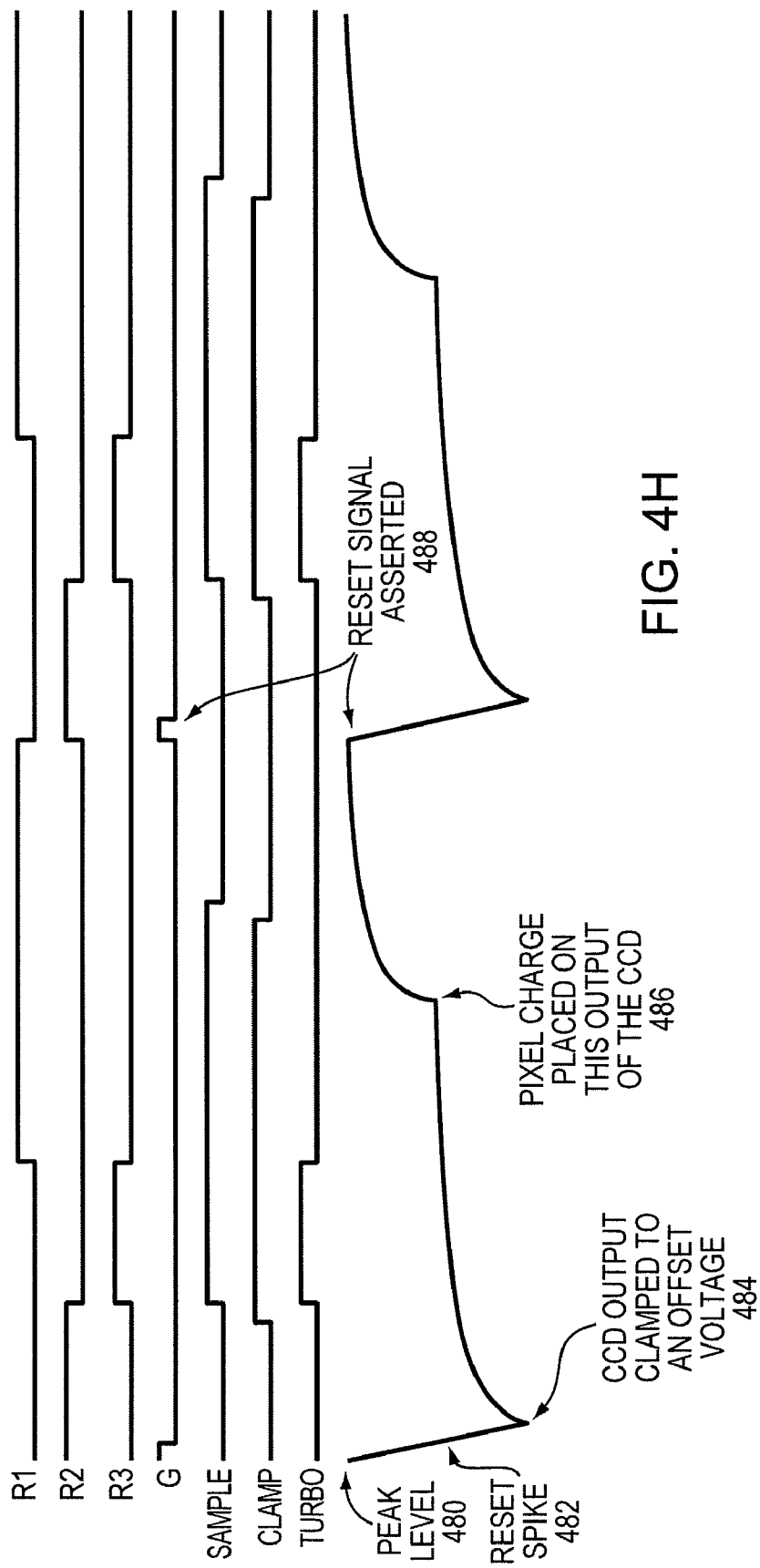
FIG. 4H shows the exemplary digital sequencer output waveforms along with an exemplary waveform of pixel charge output by a CCD according to one embodiment of the present invention.

FIG. 4H shows the exemplary digital sequencer output waveforms according to the present invention along with an exemplary waveform of pixel charge output by a CCD. From its peak level at 480, the pixel charge waveform has an abrupt downward spike. This is the reset spike 482 and as can be seen, occurs at the time the reset gate signal is asserted. From its lowest level at 484, the pixel charge waveform shows a rise that begins to level off. This rise occurs due to the CCD output being clamped to an offset voltage. The waveform approaches the value of the offset voltage. At 486, the waveform begins to rise more abruptly due to pixel charge being moved to the output. After this rise toward a peak value the pixel charge value will be sampled. After the charge is sampled, the reset clock will be asserted. As can be seen in FIG. 4H, the assertion of the Clamp, Sample, and Turbo signals do not necessarily correspond in time to the above described pixel charge waveform events. It should be understood that this is due to a lag in the response of a CCD to the signals supplied to it and the CCD's providing the corresponding output to an input module as described below. By adjusting the point in time at which the Clamp and Sample signals are asserted, the readnoise performance of a camera system can be improved. Uniquely, in this invention, as described below, the timing of the Clamp and Sample signals can be delayed incrementally to improve the performance of the camera system.

The Service Module

CCDs require bias voltages to power them. Scientific CCD cameras commonly require special circuits to power devices such as thermoelectric coolers (TECs), heaters and vacuum detectors, and to measure temperatures by means of thermistors. These circuits require configurable analog voltages. Because each circuit is capable of injecting electrical noise into the system, consideration must be given to ensure that noise injection is minimized and does not significantly impact the pixel data derived from the CCD.

Figure 5:
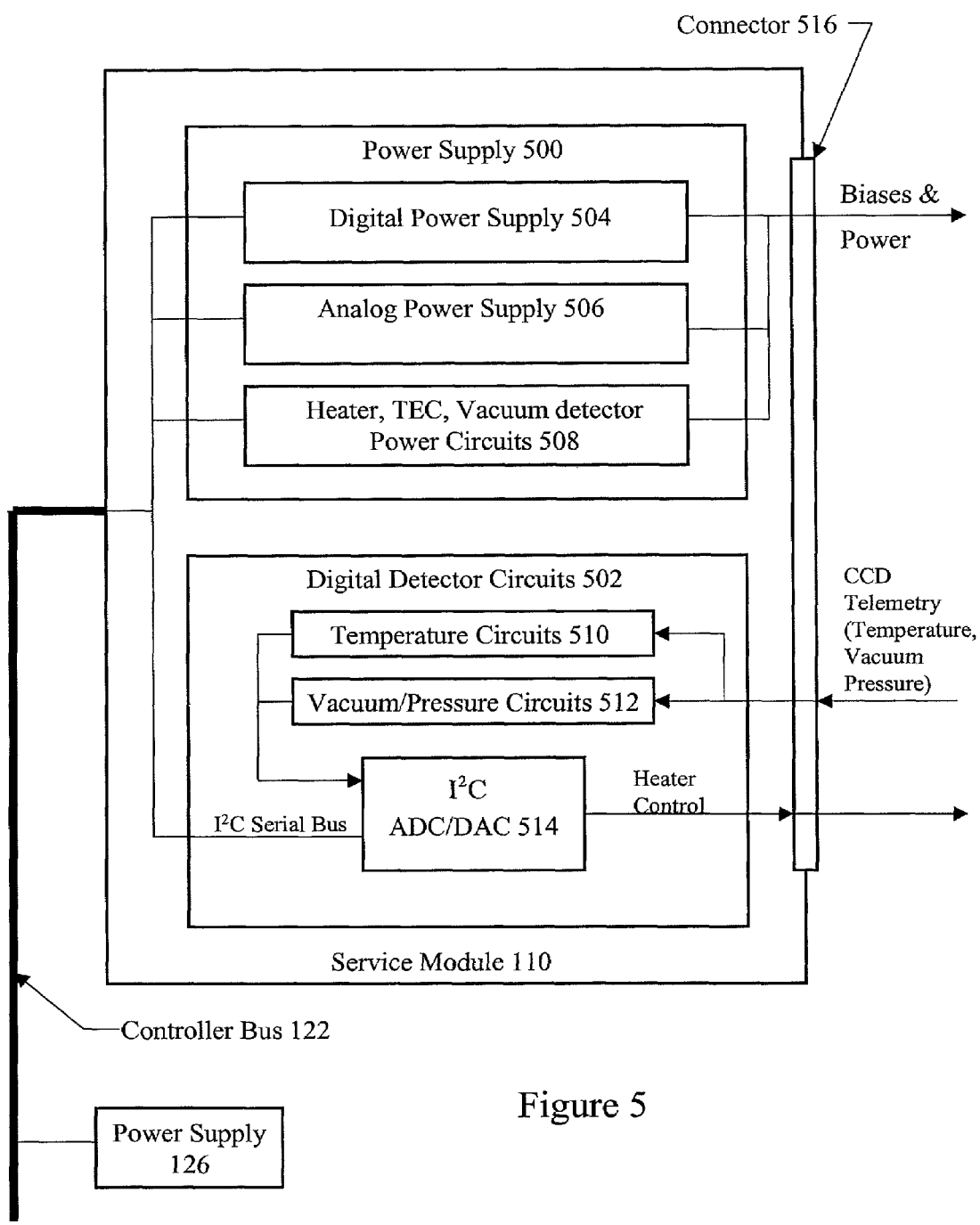
FIG. 5 is a block diagram of a Service Module according to the present invention.

FIG. 5 shows a block diagram of a Service Module 110 of the present invention. Service Module 110 comprises Power Supply 500, and Digital Detector Circuits 502. Power Supply 500 comprises Digital Power Supply 504, Analog Power Supply 506, and additional Power Circuits 508 for powering one or more heaters, TECs, and vacuum detectors. Digital Detector Circuits 502 include Temperature Circuits 510, Vacuum/Pressure Circuits 512, and I²C analog-to-digital converter/digital-to-analog converter (ADC/DAC) circuit 514.

Controller Bus 122 is supplied with power by external Power Supply 126. Service Module 110 interfaces with Controller Bus 122 providing conditioned power to the other modules through the Controller Bus 122 of Camera Control Unit 102. Analog and digital power is provided on Controller Bus 122 by Service Module 110 to each connection point on the backplane enabling Service Module 110 to supply power to other modules in the system. Analog and digital power is provided to Camera Head 104 of the system via external connector 516. A range of adjustable bias voltages are available to operate a variety of CCDs. In addition to the power and bias voltages provided to Camera Head 104, the external connector can also carry the temperature and vacuum pressure data from Camera Head 104 to Service Module 110 as well as a heater control signal from I²C ADC/DAC 514.

In a preferred embodiment, Analog Power Supply 506 of Service Module 110 can provide a maximum of three voltages to 24V, two voltages to +12V, and two voltages down to −12 V as well as analog ground. However, since the 24V is derived from a DC-DC converter in the preferred embodiment, even this limit is configurable. This range of bias voltages is sufficient to power a wide range of CCDs, but if more bias voltages were required, or if multiple CCDs were to be controlled, then additional Service Modules may be used to provide the necessary voltages.

Service Module 110 includes power supply circuits for a broad range of heaters, TECs, and vacuum detectors. In addition, Service Module 110 includes digital detection circuits to measure as many as three temperatures and vacuum pressure indicated by a standard thermocouple vacuum detector. I²C ADC/DAC 514 is used to interface with I²C Serial Bus 206 of Controller Bus 122. An eight-bit digital-to-analog converter (DAC) controlled through I²C Serial Bus 200 can be used to provide heater control. Internal case temperature, CCD temperature and vacuum data can be made available on I²C Serial Bus 206 through an eight-bit analog-to-digital converter (ADC).

The Clock Driver Module

Figure 6A:
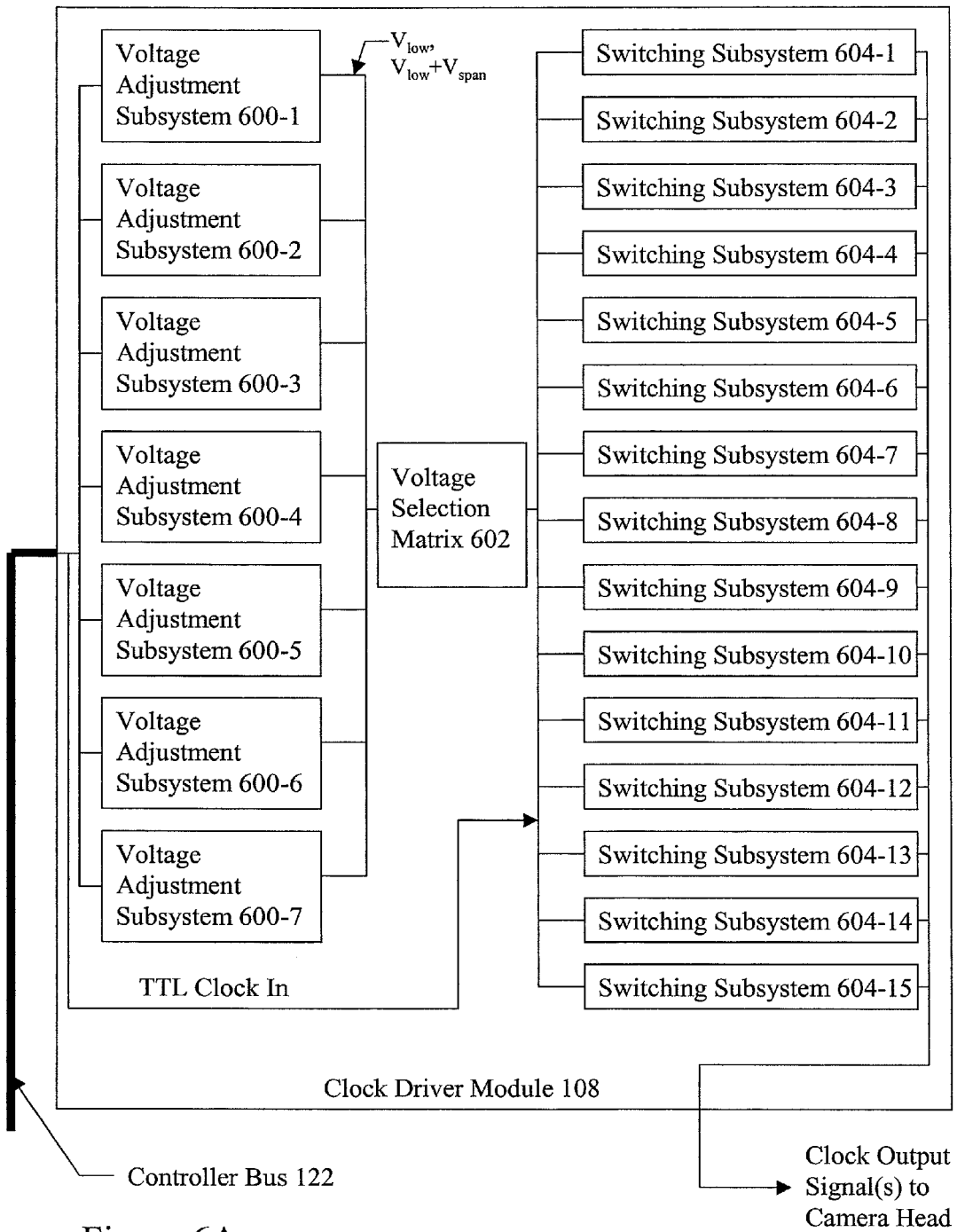
FIG. 6A is a block diagram of a Clock Driver Module of the present invention.

FIG. 6A is a block diagram of a Clock Driver Module 108 of the present invention. Clock Driver Module 108 comprises one or more Voltage Adjustment Subsystems 600, Voltage Selection Matrix 602, and Switching Subsystems 604. The embodiment shown in FIG. 6A includes seven Voltage Adjustment Subsystems and fifteen Switching Subsystems.

Clock Driver Module 108 is designed to drive a wide variety of CCDs with minimal modification through configuration. In the embodiment shown in FIG. 6A, up to seven voltage pairs can be provided, and these can be jumpered through Voltage Selection Matrix 602 into as many as fifteen clock output drivers of Switching Subsystems 604. Uniquely, in this embodiment, each voltage pair is adjusted by setting the lower voltage and then setting the span voltage up to a maximum span. In a preferred embodiment this maximum span is 16V. Prior art adjustable controllers adjust the high and low voltages independently, which can result in damaging the CCD if the voltages become reversed or exceed the maximum rated difference. In this embodiment according to the present invention, if a CCD were to require more clocks, or if multiple CCDs were to be controlled, then additional Clock Driver Modules can be used.

Figure 6B:
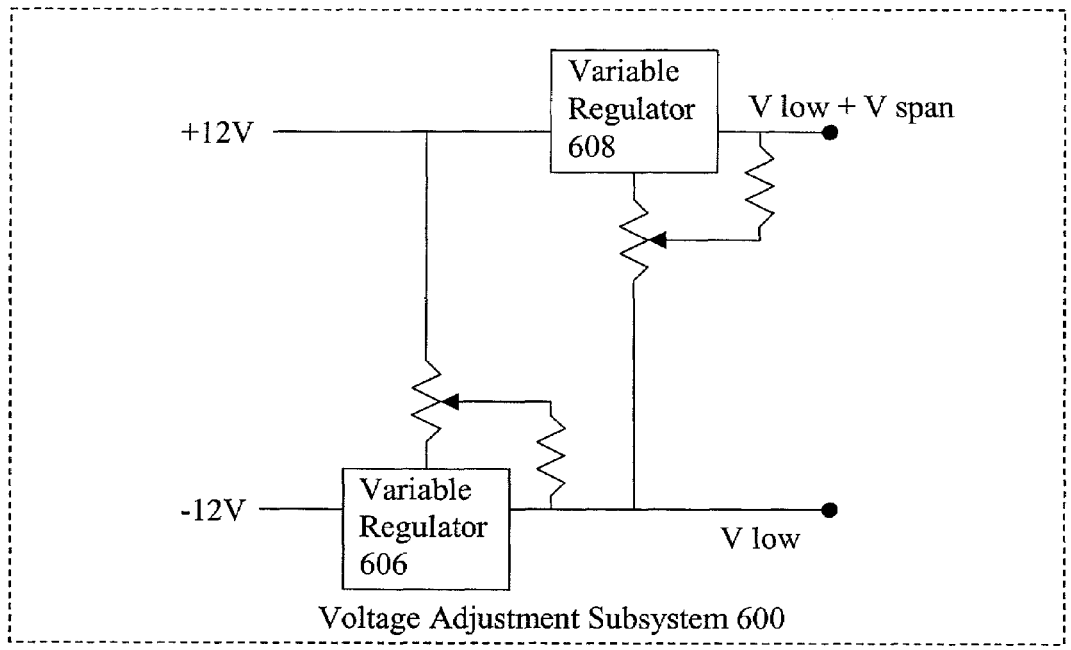
FIG. 6B shows a Voltage Adjustment Subsystem of a Clock Driver Module according to the invention.

Referring to FIG. 6B, Variable Regulator 606 of Voltage Adjustment Subsystem 600 can be adjusted to produce a voltage level, $V_{low}$, the lower level voltage that is to be supplied by this subsystem. Variable Regulator 608 can then be used to set the voltage span level, $V_{span}$, such that the upper level of the voltage that it to be supplied by this subsystem equals $V_{low}+V_{span}$. In the preferred embodiment there are seven of these Voltage Adjustment Subsystems 600 within Clock Driver Module 108.

The upper and lower voltage levels produced by each of the Voltage Adjustment Subsystems 600 are supplied to Voltage Selection Matrix 602 as shown in FIG. 6A. Voltage Selection Matrix 602 allows these voltage pairs to be supplied to a number of Switching Subsystems 604. In the preferred embodiment there are fifteen of these Switching Subsystems 604 within Clock Driver Module 108.

Figure 6C:
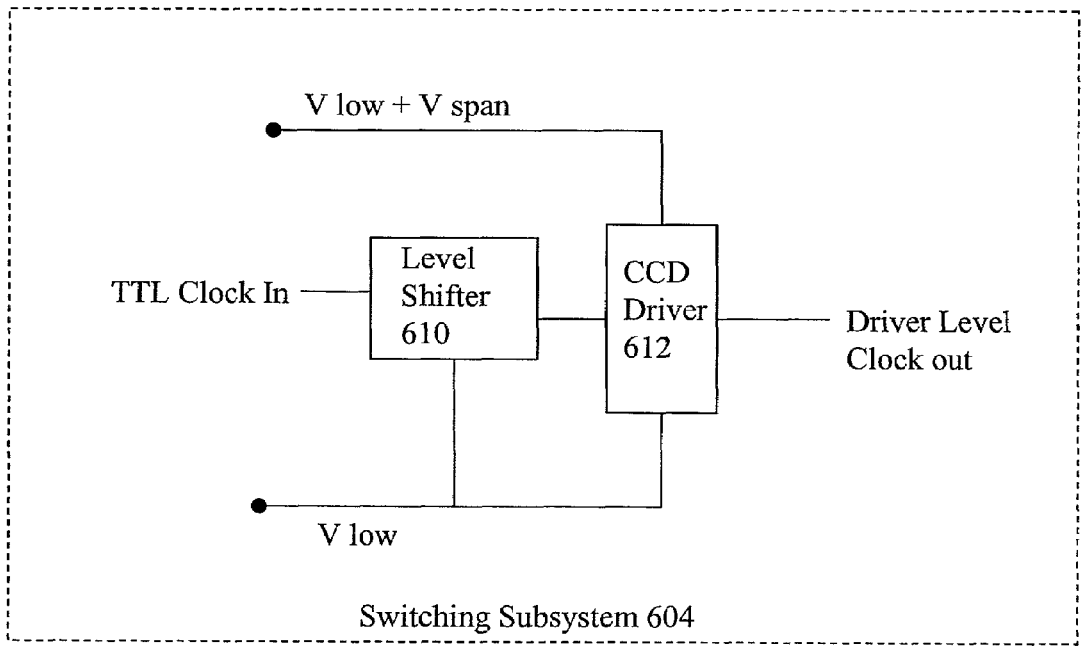
FIG. 6C shows a Switching Subsystem of a Clock Driver Module according to the invention.

Referring to FIG. 6C, a Switching Subsystem 604 is shown. A TTL level clock signal from Digital Sequencer Bus 210 is sent to Level Shifter 610. Level Shifter 610 conditions the signal level of the TTL level clock such that it is an appropriate input for CCD Driver 612. This signal is sent to CCD Driver 612 which then outputs a driver level clock output having a low clock signal level of $V_{low}$ and a high clock signal level of $V_{low}+V_{span}$ where $V_{low}$ and $V_{low}+V_{span}$ correspond to the voltage pair supplied to the given Switching Subsystem 604 by a Voltage Adjustment Subsystem 600 selected via the Voltage Selection Matrix 602. In a preferred embodiment, CCD Driver 612 is an Elantec™ 2-phase high speed CCD driver part no. US-EL7182.

Input Modules

In general, Input Modules 112 function to receive the video signals from Camera Head 104 and convert them to digital data. Although many CCDs have a single video output, a number of scientific CCDs have multiple outputs in order to increase the maximum frame rate relative to the pixel rate, which is what determines the minimum readnoise. Input Modules 112 may can have one or more video channels. Also, multiple Input Modules may be used for multiple output CCDs. Furthermore, multiple CCDs can be controlled by a single controller. Any or all of these options can be implemented in any given Input Module 112.

Ideally, a scientific CCD camera should exhibit a number of properties. A scientific CCD camera should have a range of at least two gain settings such that the lowest gain allows the observation of the maximum CCD signal, and the highest gain allows resolution of individual electrons generated by photons incident to the CCD. The lowest gain varies by CCD. The highest gain varies by the A/D converter used to convert the analog electric signal from photon excited electrons, into a digital electric signal. In general, the highest gain is 0.5 electrons per Data Number (the unit of resolution of the A/D converter). A scientific CCD camera should also run at a variety of frame and pixel rates and thus have several selectable low pass filters. Additionally, the video amplifier response should be linear and capable of calibration. The CCD camera system of the present invention exhibits these desired traits. Input Modules 112 according to the present invention have configurable gain stages and low pass filters. The video amplifier response of an Input Module 112 according to the present invention is linear and can be calibrated.

Figure 7A:
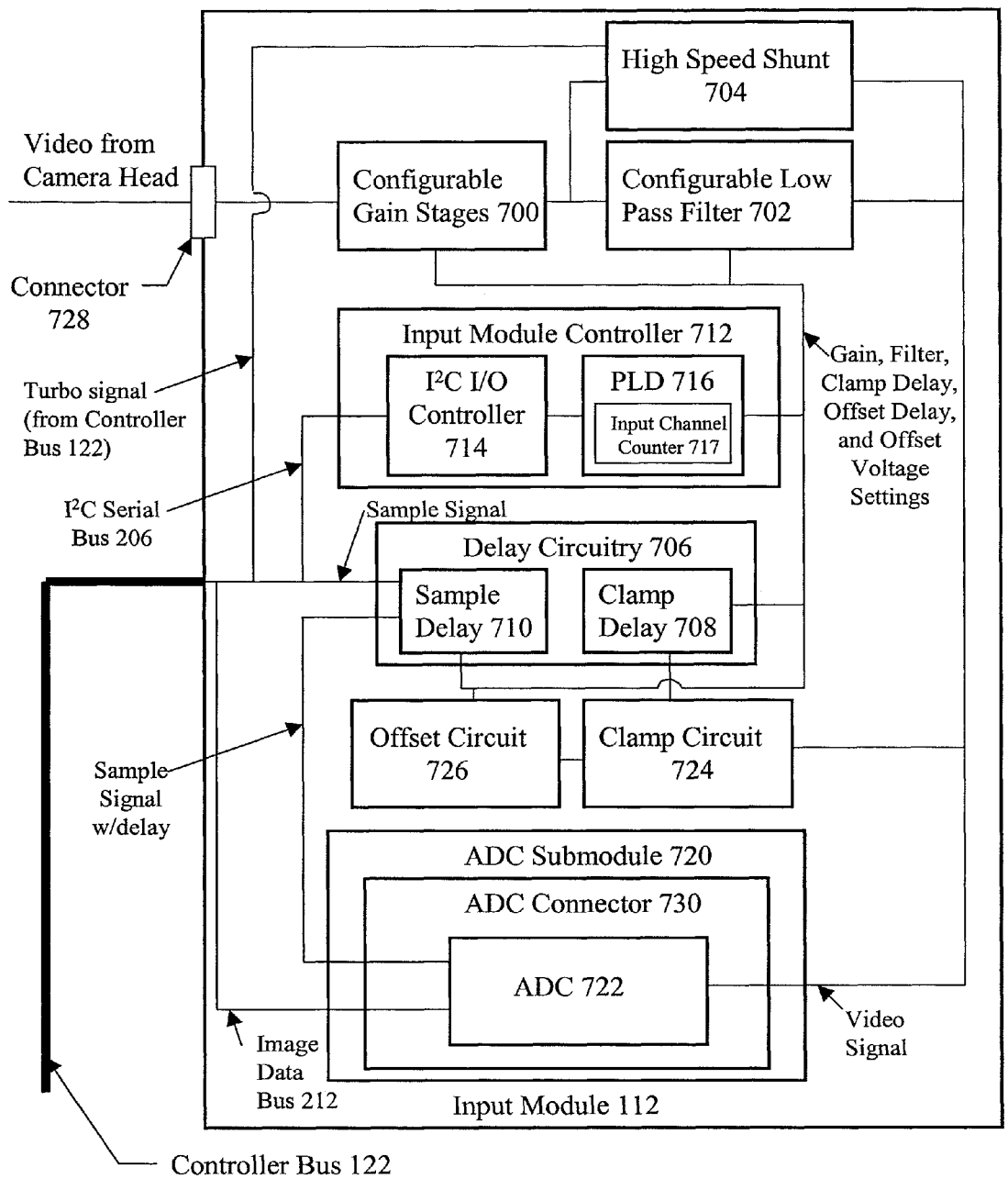
FIG. 7A is a block diagram of an Input Module of the present invention.

FIG. 7A is a block diagram of an Input Module according to the present invention. Input Module 112 interfaces with Controller Bus 122 and receives analog video data from Camera Head 104. Input Module 112 comprises Configurable Gain Stage(s) 700, Configurable Low Pass Filter(s) 702, High Speed Shunt 704, Delay Circuitry 706, Input Module Controller 712, ADC Submodule 720, Clamp Circuit 724 and Offset Circuit 726. Input Module Controller 712 comprises I²C I/O Controller 714 and PLD 716. An Input Channel Counter 715 is implemented in the PLD 717. Delay Circuitry 706 comprises Clamp Delay 708 and Sample Delay 710.

ADC Submodule 720 includes ADC Connector 730 and an Analog-to-Digital Converter (ADC) 722.

Input Modules 112 according to the present invention have Configurable Gain Stages 700 and Configurable Low-Pass Filters 702 to allow for a variety of pixel frequencies and CCD well-depths or dynamic ranges. Input Modules 112 feature pluggable ADC Submodules 720 for the Analog-to-Digital converter(s) (ADC) 722. ADC(s) can be chosen with minimal effort and expense for different bit resolutions and speeds to accommodate different signal-to-noise range requirements or component shortages. By providing a plug in connector 730 for ADC Submodule 720, a specific ADC deemed acceptable for a particular application can be plugged in to Input Module 112. Input Module 112 can use Correlated Double Sampling to minimize the effect of reset noise on the output. Configurable Low-pass Filters 702 are designed to minimize the noise at the selected readout frequencies. These, however, limit the response of the camera when binning pixels together to increase the speed and the signal-to-noise ratio. A special High Speed Shunt 704 with 75 ns switching times allows the effective removal of the filter in order to pass high speed signals during binning, and during relaxation from the reset pulse.

The timing and duration of the Clamp signal and the timing of the Sample signal relative to Reset effects the readnoise from the CCD. Accurate adjustments to the timing and duration of the Clamp signal and the timing of the Sample can be used to reduce readnoise from the CCD. In this regard, the clock frequency of 50 MHz results in a relatively crude resolution of 20 ns. Uniquely, in this embodiment, both the Clamp and Sample signals are run through digital delay lines that allow adjustment of their phases relative to Reset in increments of 0.25 ns. It is important that the delays are made in proximity to the level at which the signal is being clamped and sampled since there is variation in the time of arrival of the video signal relative to the time of arrival of the sequence bits due to delays in the cables from Input Modules 112 to the camera head, the CCD itself, and the filters on Input Modules 112. The digital delay lines are controlled through the I²C Serial Bus 206.

Command Module 106 controls the gain and filter selections via the I²C Serial Bus 206. The filter and gain settings are communicated to PLD 716 on Input Module 112. PLD 716 communicates these settings to the configurable gain stages and configurable low-pass filters where relays in the configurable gain stages and relays in the configurable low-pass filters are operated to set the gain and filter time constant, respectively. The states of the gain and filter selections can be stored in Flash RAM 418 in the Command Module 106. Similarly, the offset values and the clamp and sample delay settings can also be stored in Flash RAM 418. Input Channel Counter 717 is used by the PLD 716 to keep track of the current input channel so that by counting SKIP and READ codes as described above, the Input Module 112 can determine when image data should be written to the Image Data Bus 212.

Asserting the Reset clock can lead to feedthrough onto the video signal that greatly exceeds the magnitude of the video signal from the pixel. The low pass filters in the analog video chain that are selected in order to minimize the readnoise for a particular pixel rate must be relaxed in order to allow clamping of the reset pulse. This leads to the clamping period dominating the pixel cycle and an increase in the effective pixel rate and the readnoise. Uniquely in this design, a high speed shunt with a switching time of less than 75 ns is used to allow the video signal to relax quickly from the reset condition. This allows much more aggressive low-pass filtering and achieves lower readnoise.

Figure 7B:
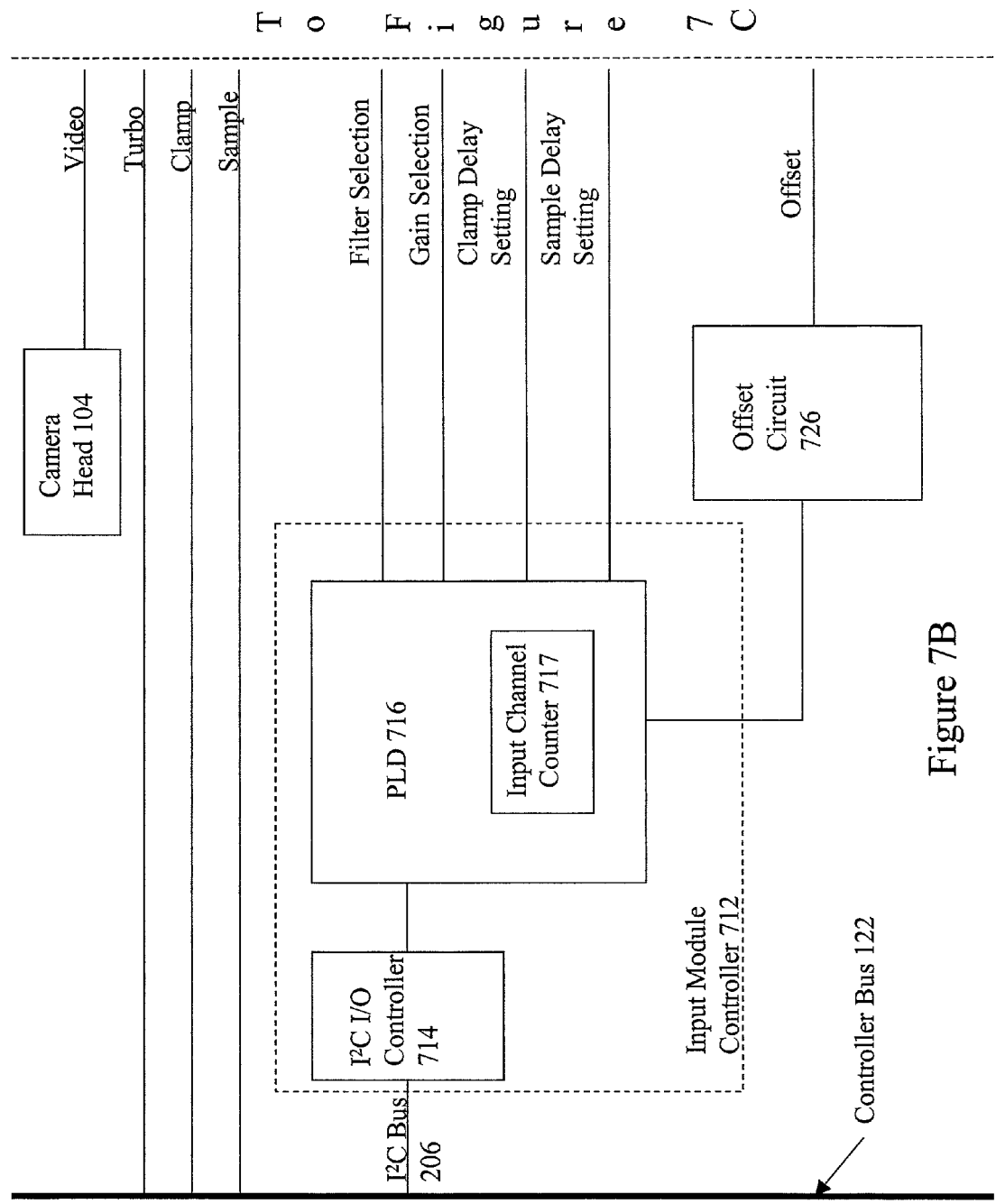
FIGS. 7B and 7C together depict a functional block diagram of an Input Module of the present invention.

Referring now to FIG. 7B, I²C I/O Controller 714 interfaces with I²C Serial Bus 206 of Controller Bus 122. I²C I/O Controller 714 communicates PLD 716. In one embodiment, I²C I/O Controller 714 is a Phillips Semiconductor™ PCF8574 8-bit I²C I/O Controller, and an Xilinx™ XC95108 CPLD is used as PLD 716. I²C I/O Controller 714 can transfer a number of settings transmitted on I²C Serial Bus 206 to PLD 716. These settings include the filter selection, gain selection, clamp delay, sample delay, and offset voltage settings. PLD 716 then directs the proper device to assume the indicated setting. PLD 716 can direct Offset Circuit 726 to output the desired offset voltage. Fine control of the offset voltage allows the maximization of the dynamic range of the signal and also enables equalization of multiple video channels when necessary. In one embodiment, the offset voltage is a 10-bit value and Offset Circuit 726 is a 10-bit D/A converter such as an Analog Devices™ model AD7397. The output of Offset Circuit 726, the filter selection, the gain selection, the clamp delay setting, and the sample delay setting as well at the video output from Camera Head 104 are shown being carried over to FIG. 7C. In addition, the Turbo, Clamp, and Sample signals from Controller Bus 122 are also carried over to FIG. 7C.

Figure 7C:
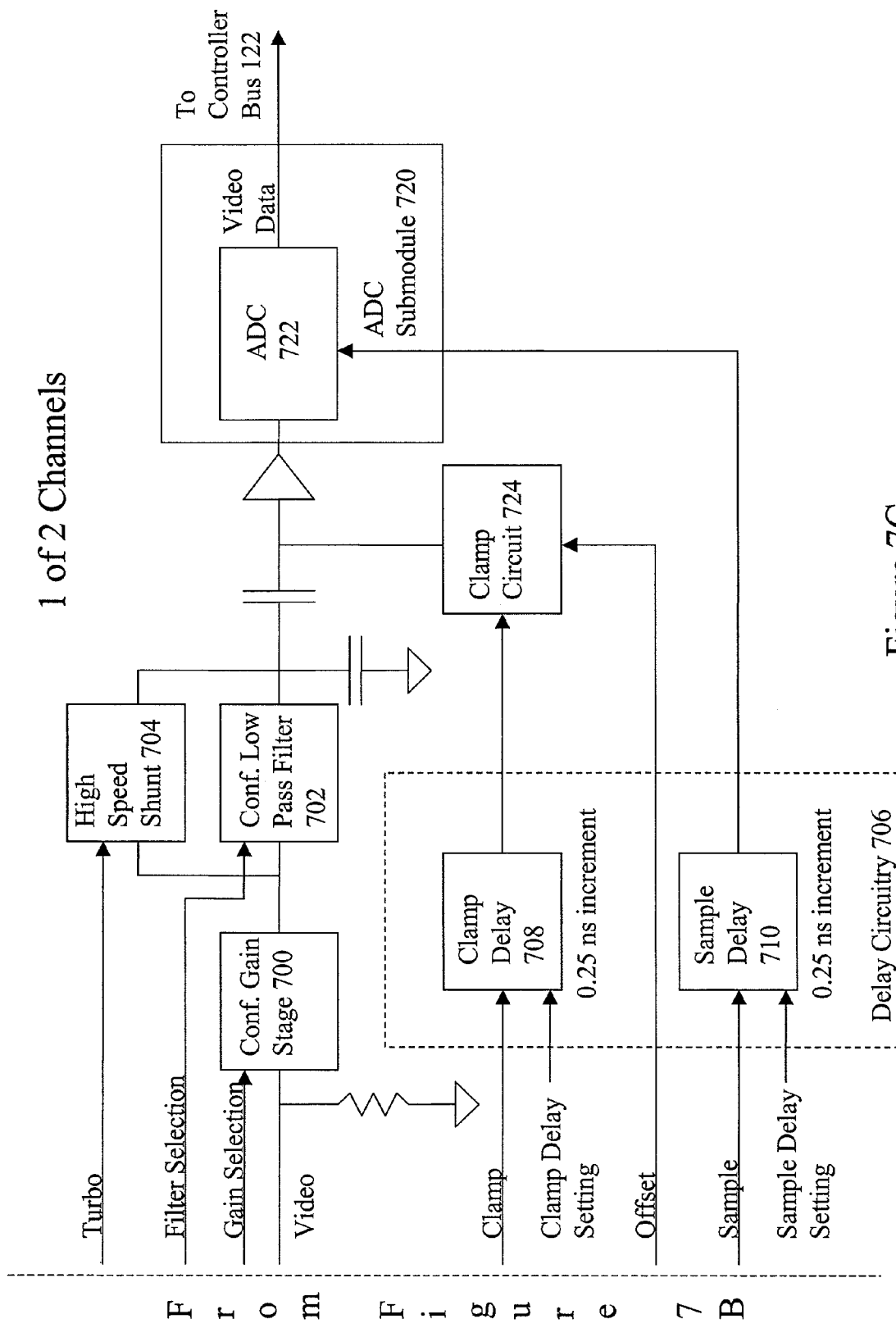

Referring now to FIG. 7C, the signals carried over from FIG. 7B are shown being supplied to one of two video processing channels of one embodiment of an Input Module 112 according to the present invention. The offset voltage from Offset Circuit 726 of FIG. 7B is shown being input to Clamp Circuit 724. The Clamp signal and Clamp Delay Setting are shown as being input to Clamp Delay 708. The Sample signal and the Sample Delay Setting are shown as being input to Sample Delay 710. Clamp Delay 708 and Sample Delay 710 allow the Clamp and Sample signals to be delayed in 0.25 nanosecond increments. In one embodiment the Clamp and Sample Delay Settings each comprise eight bits and a Dallas Semiconductor™ model DS1020 delay line is used as Clamp Delay 708 and another for Sample Delay 710. The output of Sample Delay 710 is sent to ADC 722 of ADC Submodule 720. The output of Clamp Delay 708 is sent to Clamp Circuit 724.

The Filter Selection and Gain Selection settings from PLD 716 are sent to Configurable Low Pass Filters 702 and Configurable Gain Stages 700 respectively. In one embodiment, the Filter Selection setting comprises two bits allowing for the selection of one of four time constants for Configurable Low Pass Filters 702. In one embodiment, the Gain Selection setting comprises two bits allowing for the selection of one of four gain settings for Configurable Gain Stages 700. Video from Camera Head 104 is input to Configurable Gain Stages 700. The output of Configurable Gain Stages 700 is sent to Configurable Low Pass Filter 702. The Turbo Signal of Controller Bus 122 is input to High Speed Shunt 704. High Speed Shunt 704, if closed, will bypass Configurable Low Pass Filters 702. High Speed Shunt 704 is closed by assertion of the Turbo Signal.

Input Modules 112 of the present invention utilize Correlated Double Sampling when digitizing the video signal by capacitively coupling the video signal and clamping it to an offset voltage using a Clamp signal that is part of the sequence. The outputs of Configurable Low Pass Filter 702 and High Speed Shunt 704 are shown capacitively coupled to the output of Clamp Circuit 724. When operated, Clamp Circuit 724 will close and clamp the capacitively coupled Video Signal from either the Configurable Low Pass Filters 702 in the case that High Speed Shunt 704 is open or the High Speed Shunt 704 in case High Speed Shunt 704 is closed, to the Offset Voltage. Clamp Circuit 724 is closed by assertion of the Clamp Signal (plus any delay added thereto by Clamp Delay 708). In one embodiment, a field effect transistor such as a Vishay™ SD210 is used as Clamp Circuit 724. In response, Clamp Circuit 724 holds the Clamp signal in an "on" state until the video signal is pulled to the clamp voltage level and defines the lower limit of the video signal that is digitized. Then the Clamp signal is removed and the pixel charge is moved onto the output of the CCD and the voltage level will rise in proportion to the charge in the pixel. ADC 722 converts this analog voltage into digital data in response to by assertion of the Sample signal that is also part of the sequence (plus any delay added thereto by Sample Delay 710). ADC 722 places the digital video data on Image Data Bus 212 of Controller Bus 122. The Reset clock is then asserted and the cycle starts over again.

Figure 7D:
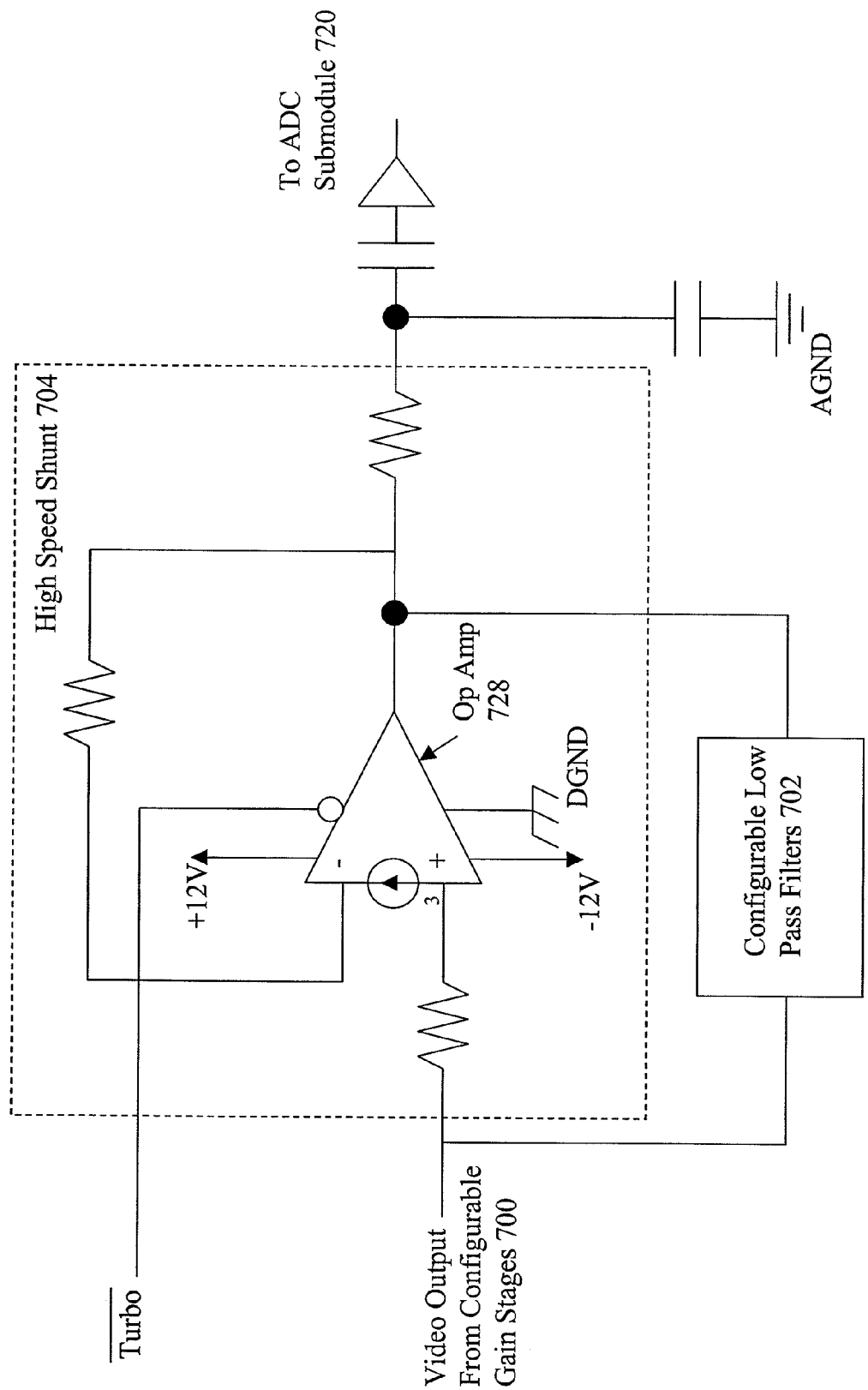
FIG. 7D shows an embodiment of the High Speed Shunt of the present invention.

One possible embodiment of High Speed Shunt 704 can use an analog switch. Another alternative embodiment, however, is to use an Operational Amplifier (Op Amp) with high speed enable. FIG. 7D depicts the latter embodiment of High Speed Shunt 704. In this embodiment, the High Speed Shunt 704 comprises an Operational Amplifier ("Op Amp") 728. Op Amp 728 includes a high speed enable, a feature of some commercially available Op Amps such as the Elantec™ EL2166CN Op Amp. The on-resistance of the Op Amp is approximately 10 Ohms compared to an on-resistance of approximately 50 ohms if an analog switch were used. An ideal shunt would be a short circuit around the Configurable Low Pass Filters 702. The lower on-resistance of this embodiment allows the reset pulse to settle more quickly and thus makes a more effective shunt.

Control codes synchronize the flow of Image Data within Controller Bus 122 and within Input Modules 112 in particular. The LATCH code signals all Input Modules to latch the data from the A/D converters 722 into their output latches. Each video channel on each Input Module has a unique number and each Input Module has a current input channel counter that counts SKIP and READ codes and increments the current channel number with each. If a video channel sees a READ and the current channel number is its own, it outputs its data onto Image Data Bus 212. If instead it sees a SKIP, or its own channel number is not current, then it does nothing. This scheme uniquely allows varying numbers of channels and Input Modules and is especially useful in running multiple CCDs from a single CCD Controller. It has also been used to enable the use of multiple Input Modules per CCD output in order to gain different bit resolutions and readout speeds. The current channel number is reset by DATA READY and SOL (Start of Line).

ADC Submodules

In general there is a trade off in A/D converters between speed and bit resolution. There is also a wide variety of A/D converters available at any given speed and bit resolution. These vary in many ways, ranging from voltage conversion range, to pipeline depth in the digital readout, to cost. In addition, A/D converters are in a class of semiconductors whose price and availability is highly variable due to their increasing use in consumer products and surges in their popularity. For all these reasons it is best to abstract the A/D converter by incorporating it into ADC Submodule 720 which is provided with a standard connector on Input Module 112. This also leads to an extremely short time to market for new A/D converters.

As shown in FIG. 7C, ADC Submodule 720 can be provided with +12V, −12V, and Analog Ground along with the video signal (after it has passed though the gain and filter stages) and the Sample signal (plus any added delay). ADC Submodule 720 provides data to a 16-bit data path with a code signifying the actual bit resolution of the data.

Output Modules

Figure 8:
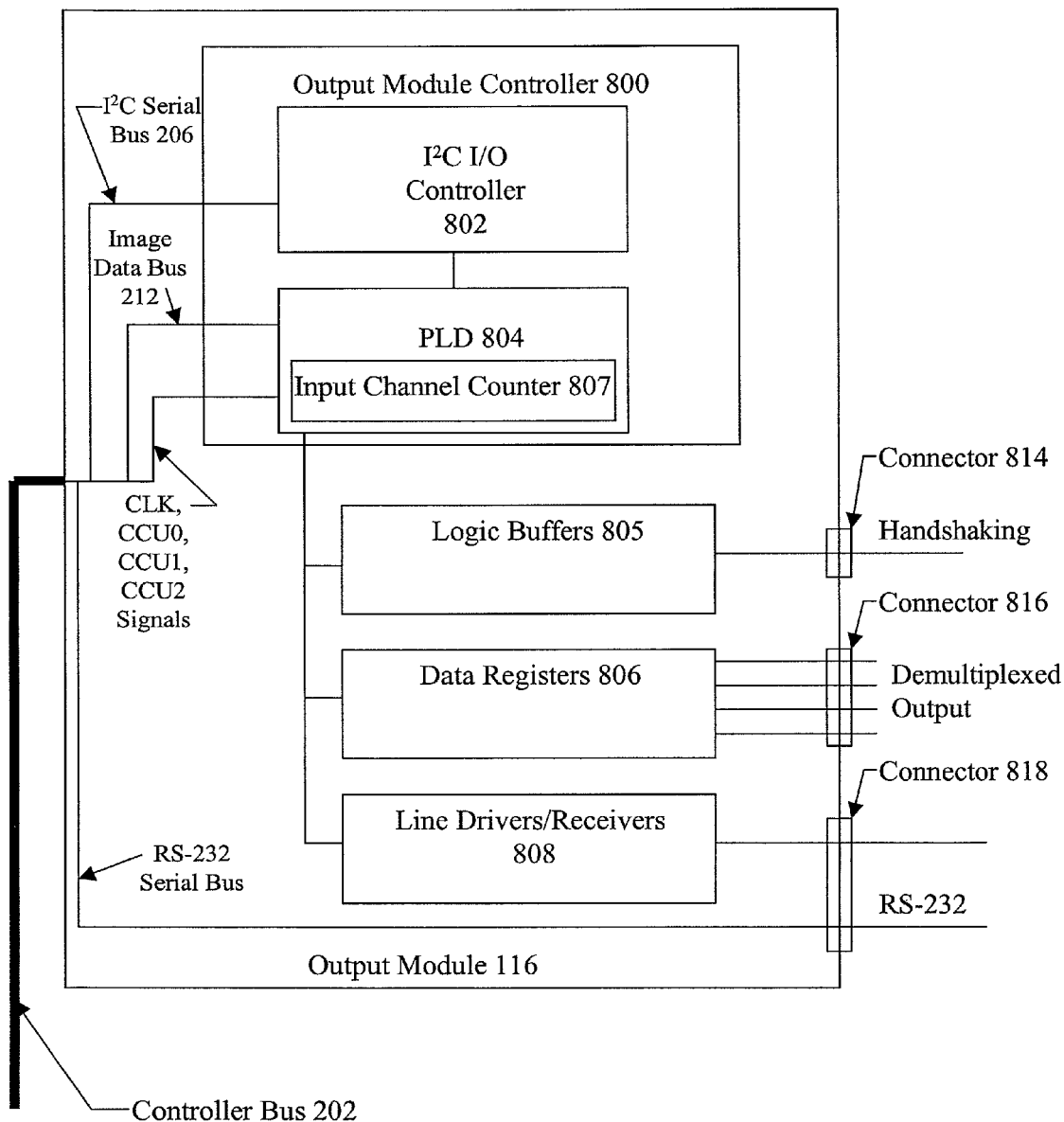
FIG. 8 is a block diagram of an Output Module of the present invention.

A block diagram of an Output Module 116 according to the present invention is shown in FIG. 8. Output Module 116 comprises Output Module Controller 800, Logic Buffers 805, Data Registers 806, Line Drivers/Receivers 808, and Connectors 814, 816, and 818. Output Module Controller 800 comprises I²C Controller 802, and PLD 804. Input Channel Counter 807 is implemented in PLD 804.

The I²C I/O Controller 802 interfaces with I²C Serial Bus 206 and with PLD 804. Through the I²C Bus, a Command Module 106 can select a mode of operation for an Output Module 116. For example, Command Module 106 can instruct Output Module 116 to output AIA standard data on Connector 818 or, alternatively, instruct Output Module 116 to output demultiplexed data on Connector 816.

PLD 804 receives digital video data from Image Data Bus 212. PLD 804 also receives the system clock signal, and control code signals CCU0, CCU1, and CCU2. Using these signals, the PLD can provide a number of digital camera output formats to an external device, including multiplexed AIA standard video output on Connector 818 or demultiplexed video output on Connector 816. It should be understood that Connector 816 can comprise a number of connectors, each carrying a subset of the demultiplexed video data. In one embodiment, Connector 816 comprises four connectors.

Logic Buffers 805 receive handshaking data from PLD 804 and make this information available on connector 814. PLD 804 receives control code signals CCU0, CCU1, and CCU2 from the Digital Sequencer Bus 210. Using the control codes and the image data, PLD 804 can derive handshaking information. The handshaking data can include dedicated TTL level output lines for SOF, SOL, and DATA READY. An external device 124 can use the handshaking information on connector 814 to determine the meaning of the digital video data it is receiving from Output Module 116.

Data Registers 806 receive demultiplexed video data from the PLD 804 and provide this data on Connector 816. An external device 124 can interface with Connector 816 to receive the demultiplexed video data.

Line Drivers/Receivers 808 interface with Connector 818. An external device 124 can interface with Connector 818 to communicate with Output Module 116. Line Drivers/Receivers 808 receive multiplexed video data from PLD 804. Line Drivers/Receivers 808 provide this data on connector 818. Line Drivers/Receivers can receive data from external device 124 allowing communication between the external device 124 and Output Module 116. In one embodiment, the format of the data output on, and received on Connector 816 conforms to an AIA-compatible digital video interface. Connector 818 can also include an interface to RS-232 Serial Bus 206.

A variety of digital camera formats exist that can easily be derived from the SOF, SOL, DATA READY control codes and the Image Data. Digital data can be output directly with a digital stream from each output port of a CCD, but data can also be multiplexed and provided in a standard AIA-compatible or other format. This provides platform independence since there is a wide variety of AIA-compatible and other standard digital frame grabbers for a number of computer platforms and operating systems. In one embodiment, two forms of digital camera interface have been implemented in the camera system.

The first interface form is a demultiplexed form where the digital data from each channel is presented at connector 816 and overflow and handshaking information (SOF, SOL, etc) is available at connector 814. This is a simple, efficient and effective means of transmitting the data for real-time processing. In this case, Output Module 116 counts READ and SKIP codes in order to assign the correct port number to the data for output. In one embodiment, there are four output ports or sub-connectors of connector 816. As described above, the control code READ is used to put the current input channel data onto Image Data Bus 212 and increment the Input Channel Counter 807. SKIP is used to increment the input channel counter and to indicate that the current input channel is being skipped. Hence, by counting READ and SKIP codes Output Module 116 can determine which input channel on Input Module 112 that the current image data corresponds to and assign the data to the correct output port.

The second interface form uses the standard AIA protocol for digital cameras. This standard is widely used and there is a vast array of products available for a variety of computer platforms and operating systems that support the standard. In the case of multiple output CCDs and in controlling multiple CCDs from a single controller, it is particularly useful to have all the data integrated into a single data stream for the purposes of time registration and data manipulation. The AIA standard also incorporates an RS-232 serial port and specifies a command protocol.

Preamplifier Module

Figure 9:
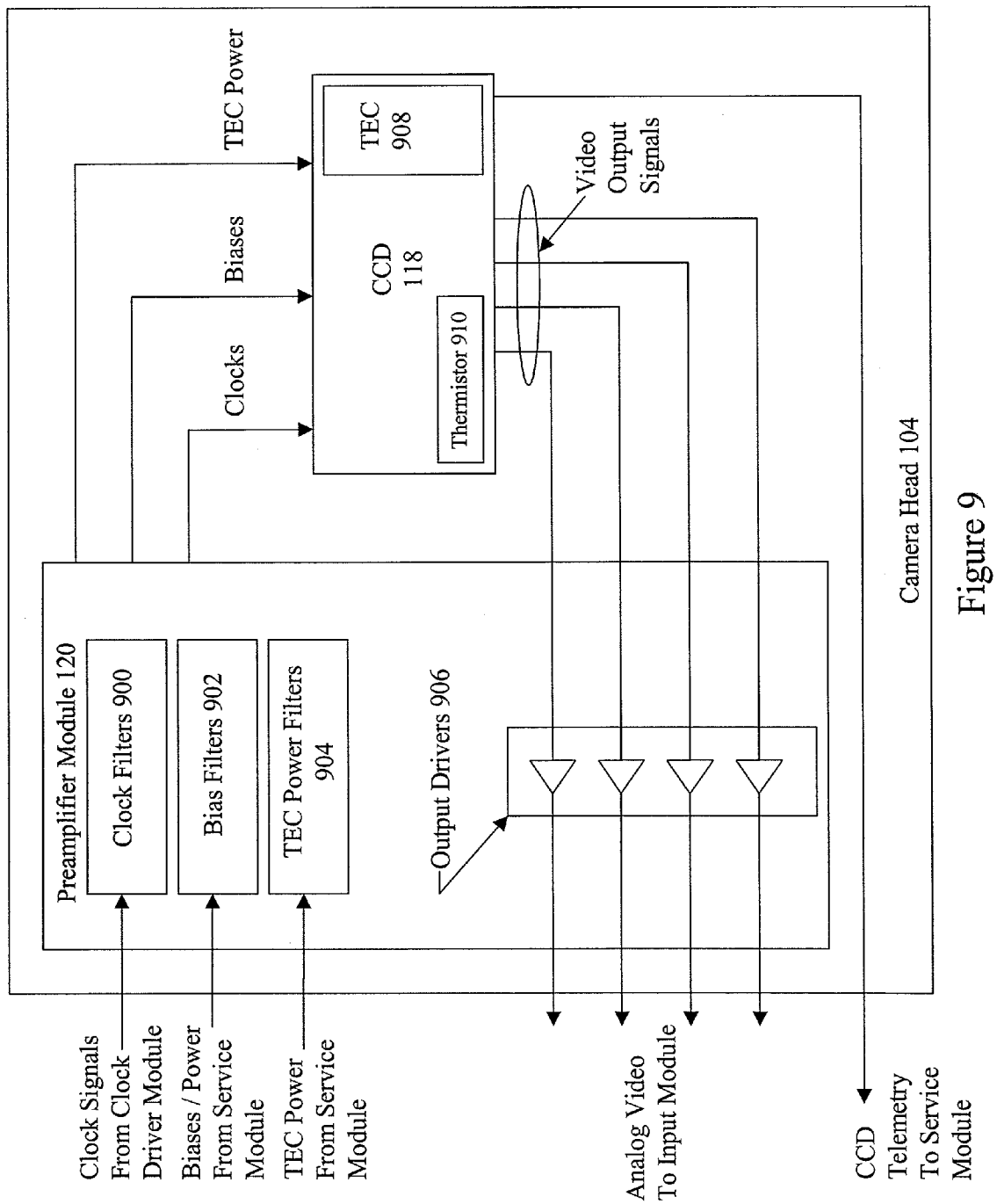
FIG. 9 is a block diagram of a Camera Head of the present invention including a Preamplifier Module and a CCD.

FIG. 9 is a block diagram of a Camera Head 104 of the present invention. Camera Head 104 comprises a Preamplifier Module 120, and CCD 118. Preamplifier Module 120 comprises Clock Filters 900, Bias Filters 902, TEC Power Filters 904, and Output Drivers 906. Clock signals from Clock Driver Module 108, and bias voltages, and TEC power from Service Module 110 are received by Preamplifier Module 120. Clock Filters 900 remove high frequency harmonics from the clock signals and limit the clock transition times. Hence, the clock transition times can be limited as recommended by the manufacturer of the CCD being used in the camera head. Bias Filters 902 and TEC Power Filers 904 remove high frequency harmonics from the bias voltages and TEC power, respectively. The conditioned Clocks, Biases and TEC Power are provided to CCD 118 by Preamplifier Module 120. CCD 118 preferably includes a TEC device 908 to cool the CCD, minimizing dark current. CCD 118 also preferably includes at least one on-board Thermistor 910 for monitoring the temperature of the CCD. The output of Thermistor 910 is provided to Service Module 110. In additional to temperature, vacuum pressure data and other telemetry may also be provided to Service Module 110. Video output from the CCD is sent to Output Drivers 906. Output Drivers 906 are designed to provide a standard responsivity per electron of charge in the CCD. Output Drivers 906 are also designed to provide impedance matched output to an Input Module 112.

In one embodiment an e2v Technologies™ (formerly Marconi Applied Technologies™) CCD model CCD39 in an integral solid state cooler package is used as CCD 118. In this embodiment, four video output signals are sent to four Output Drivers 906. Each of the four video signals carries the video output from a respective quadrant of CCD 118. Further, as shown in FIG. 1, Camera System 100 can include two Input Modules 112, each Input Module 112 processing the video output from two quadrants of the CCD.

Generally, to optimize readnoise performance, it is advantageous to have CCD 118 and Preamplifier Module 120 in a Camera Head 104 that is separated from the Camera Control Unit 102 and connected thereto by cables. This also makes it simple to control multiple CCDs from a single Camera Control Unit 102. Although Preamplifier Module 120 is not technically part of Camera Control Unit 102, and does not plug into Controller Bus 122, it serves to make the CCD an abstract entity. It does this by conditioning the clocks and biases from Clock Driver Module(s) 108 and Service Module(s) 110, and processing the video output from the CCD to provide a standard responsivity.

The CCD clocks need fast rise times in order to traverse the cable without losing integrity. However, these fast rise times can lead to high frequency harmonics in Camera Head 104 and generate noise in the signal. The clocks are therefore conditioned with Clock Filters 900 on Preamplifier Module 120 to achieve the appropriate rise times. Experience has indicated that an optimal value for responsivity from the CCD is twenty microvolts of signal for each electron of charge. Impedance matched Output Drivers 906 send the video signal to CCU 102, preferably over seventy-five ohm cables utilizing standard BNC connectors.

The system is therefore preferably designed to accommodate a standardized CCD responsivity of twenty microvolts per electron. This is standard in Massachusetts Institute of Technology (MIT)/Lincoln Laboratory CCDs, but other CCDs such as the e2v Technologies™ CCD39 require a preamplifier with the appropriate gain and cable drivers as described above. This builds the output personality of the CCD into the camera head where it is best suited.

Disclosed herein is a high frame rate, low read noise, modular, flexible, relatively inexpensive CCD Controller Toolbox. Also disclosed herein is a high frame rate, low read noise CCD camera for adaptive optics, wavefront sensing, interferometry, fringe tracking and neuroscience.

A small form factor, high frame rate, low read noise CCD Controller Toolbox has been developed. Highly modular, versatile and flexible, it is computer platform and operating system independent by design. The controller is based on a bus design to allow development of individual modules for various aspects of CCD operation. This is particularly useful for interfacing the wide range of CCDs available that utilize a variety of clock signals, bias voltages and output port configurations. Initially configured for the e2v Technologies™ (formerly Marconi Applied Technologies™) CCD model CCD39, the controller has been tested at frame rates of 40 Hz to 1000 Hz and meets or exceeds the CCD manufacturer's specifications under all conditions. CCD input personality in the form of bias and clock voltages can be configured through flexible Service and Clock Driver Modules. CCD output personality in the form of impedance-matching and buffering of video signals is achieved through a personalized Preamplifier Module that generates a standardized photon responsivity. The Input Modules can then be customized for the desired range of pixel frequencies, dynamic range and signal-to-noise ratio by selection of a handful of components. Versatile clocking and readout is achieved by means of a flexible, programmable sequencer. Due to the complete representation of the data on the backplane, output modules can be expected to accommodate any and all digital camera protocols. In particular, the controller supports the standard Automated Imaging Association (AIA) protocol for digital camera interfaces for data output and camera control. The data interface complies with accepted data transport standards that are widely available across platforms and operating systems.

Functional separation of the controller into modules allows customization by function without a complete redesign. In addition, the bus structure allows for adapting the design for different numbers of CCD output ports, as well as an open architecture for customer-designed circuit boards for other functions. The open architecture of the bus allows the end user to develop replacement or add-in modules as needed to provide additional features or functions for a variety of camera system uses and implementations. Almost all of the discrete logic can be designed into programmable logic devices (PLDs), reducing size and power by an order of magnitude, while offering the flexibility of programmability.

A unique feature of the CCD Controller Toolbox is the ease with which it can be configured to gain the highest possible performance in terms of small form factor, high speed and low readnoise for a wide variety of CCDs. Each aspect of CCD control is encapsulated in a specific module. Each module is extremely flexible, and except for the preamplifier, can be configured to run all known CCDs without redesign. The camera system has a small form factor and high performance relative to prior art designs in terms of speed and readnoise. Clock and readout sequences can be composed in a high level language, compiled and uploaded into the controller. The bus structure of the design allows the controller to be extended functionally, for example, to support multiple CCDs. Due to its open architecture design, the controller can be customized by a system integrator or end user by designing additional special purpose modules or special purpose replacement modules.

The controller and camera head of the present invention are small and light enough to be suitable for use in adaptive optics systems and on conventional light microscopes. Objectives in the design of the present invention include versatility, modularity and developing a small remote head, rather than the smallest monolithic camera possible. Versatility and modularity are important in meeting the contrasting needs of wavefront sensing and fringe tracking, and a small remote head is useful in very tight optical arrangements as well as in excluding the majority of the electronics from the necessity of operating in vacuum.

Potential applications include wavefront-sensing for adaptive optics and fringe-tracking for interferometry. Since the camera is small, lightweight and consumes little power, it can easily be adapted to comply with space flight requirements. It may be implemented by the astronomy community for use in adaptive optics systems. Another major application for the camera is use in neuroscience and other high-speed, low output fluorescence phenomena in a laboratory microscopy environment. There are several areas of study that require high-speed imaging of fluorescent dyes in the brain, at rates of the order of 1000-5000 frames per second. Study of individual neurons requires sub-millisecond time resolution of extremely small signals and study of large neuronal complexes requires extremely high signal-to-noise ratios at millisecond time resolution of small signals on relatively bright backgrounds. Binning mode capabilities meeting these frame rate requirements make the camera system ideally suited for these applications.

The CCD Controller Toolbox of the present invention is extensible to a wide variety of CCDs by design, while allowing the highest possible performance of a CCD to be realized. Although the camera can stand alone, and can support a variety of output formats, it can be computer-controlled and can provide calibrated digital data if it is to be used in science.

Any trademarks listed herein are the property of their respective owners, and reference herein to such trademarks is intended only to indicate the source of a particular product or service.

Although the invention has been described herein with reference to specific embodiments and examples, it is not necessarily intended to limit the scope of the invention to the specific embodiments and examples disclosed. Thus, in addition to claiming the subject matter literally as defined in the appended claims, all modifications, alterations, and equivalents to which the applicant is entitled by law, are herein expressly reserved by the following claims.

What is claimed is:

1. A command module apparatus for controlling a camera comprising:
    a memory register;
    a microcontroller communicably connected to said memory register and configured to receive digital sequence data from an external device, store said digital sequence data in said memory register, and generate a run command signal; and
    a programmable logic device communicably connected to said microcontroller and said memory register, configured to receive said run command signal, and in response read said digital sequence data from said memory register and to provide digital waveform data for an image pixel array corresponding to said digital sequence data, the digital waveform data comprising control bits capable of at least one of (i) indicating a start of a new frame of video data or (ii) indicating a start of a new line of video data,
    wherein the command module apparatus is capable of outputting the digital waveform data on a bus.

2. The apparatus of claim 1 wherein the bus comprises a plurality of conductors.

3. The apparatus of claim 1 wherein the control bits are capable of being used by additional modules connected to the bus for controlling the additional modules.

4. The apparatus of claim 1 wherein the control bits comprise three bits.

5. The apparatus of claim 1 wherein the microcontroller communicates via said bus with other modules connected to said bus using I.sup.2C serial protocol.

6. The apparatus of claim 5 wherein the microcontroller communicates gain setting data to an input module using I.sup.2C serial protocol.

7. The apparatus of claim 5 wherein the microcontroller communicates filter setting data to an input module using I.sup.2C serial protocol.

8. The apparatus of claim 5 wherein the microcontroller communicates offset voltage setting data to an input module I.sup.2C serial protocol.

9. The apparatus of claim 1 wherein the microcontroller is configured to receive digital sequence data from an external device, and store said digital sequence data in said memory register.

10. The apparatus of claim 9 wherein the external device transmits the digital sequence data to the microcontroller using RS-232 serial protocol.

11. The apparatus of claim 1 wherein the memory register comprises static random access memory (RAM).

12. The apparatus of claim 11 wherein the static RAM comprises:
    a pattern RAM configured to store digital sequence data;
    a control RAM having a plurality of programs written to direct the programmable logic device to execute specific digital sequence data contained the pattern RAM.

13. The apparatus of claim 11 wherein the digital sequence data comprises digital pattern data words and static RAM comprises:
    a pattern RAM configured to store digital pattern data words;
    a control RAM having a plurality of programs written to direct the programmable logic device to execute specific digital pattern data words contained the pattern RAM.

14. The apparatus of claim 2 wherein the memory register comprises static RAM and flash RAM.

15. The apparatus of claim 6 wherein digital sequence data is stored in said flash RAM.

16. The apparatus of claim 7 wherein control parameters for controlling additional modules connected to said bus are stored in said flash RAM.

17. The apparatus of claim 1 wherein the programmable logic device is a Xilinx® 9500 series CPLD.

18. The apparatus of claim 12 wherein the apparatus is configured to communicate with an external device via an external connector.

19. The apparatus of claim 18 wherein the apparatus is configured to receive a program selection from an external device indicating one of the plurality of programs in the control RAM to be run.

20. The apparatus of claim 19 wherein the program selection is received via three bits.

21. The apparatus of claim 18 wherein the programmable logic device is configured to receive a run command signal from the external device.

22. The apparatus of claim 18 wherein the programmable logic device is configured to send a start-of-integration signal to the external device.

23. The apparatus of claim 18 wherein the programmable logic device is configured to send a start-of-sequence command to the external device.

24. A command module apparatus for controlling a camera comprising:
   a memory register comprising static RAM and flash RAM;
   a microcontroller communicably connected to said memory register and configured to receive digital sequence data from an external source, store said digital sequence data in said memory register, and generate a run command signal;
   a programmable logic device communicably connected to said microcontroller and said memory register, configured to receive the run command signal, and in response read said digital sequence data from said memory register and to provide digital waveform data for an image pixel array corresponding to said digital sequence data to a bus having a plurality of conductors.

25. The apparatus of claim 24, wherein the digital waveform data comprises control bits capable of at least one of (i) indicating a start of a new frame of video data or (ii) indicating a start of a new line of video data,
   wherein the programmable logic device is configured to provide the digital waveform data onto a bus.

* * * * *